(12) United States Patent
Okada et al.

(10) Patent No.: US 10,096,431 B2
(45) Date of Patent: Oct. 9, 2018

(54) DYE-SENSITIZED SOLAR CELL ELEMENT FOR LOW ILLUMINANCE

(71) Applicant: FUJIKURA LTD., Koto-ku, Tokyo (JP)

(72) Inventors: Kenichi Okada, Chiba (JP); Naoshi Yamada, Chiba (JP); Katsuyoshi Endoh, Chiba (JP); Hiroki Usui, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 208 days.

(21) Appl. No.: 14/424,733

(22) PCT Filed: Aug. 31, 2013

(86) PCT No.: PCT/JP2013/073453
§ 371 (c)(1),
(2) Date: Feb. 27, 2015

(87) PCT Pub. No.: WO2014/094913
PCT Pub. Date: Mar. 6, 2014

(65) Prior Publication Data
US 2015/0243448 A1 Aug. 27, 2015

(30) Foreign Application Priority Data

Sep. 1, 2012 (JP) ................................. 2012-192704
Sep. 1, 2012 (JP) ................................. 2012-192706
Sep. 1, 2012 (JP) ................................. 2012-192707

(51) Int. Cl.
*H01L 31/00* (2006.01)
*H01G 9/20* (2006.01)

(52) U.S. Cl.
CPC ......... *H01G 9/2077* (2013.01); *H01G 9/2081* (2013.01); *H01G 9/2031* (2013.01); *H01G 9/2059* (2013.01); *Y02E 10/542* (2013.01)

(58) Field of Classification Search
CPC .. H01G 9/2077; H01G 9/2081; H01G 9/2031; H01G 9/2059
See application file for complete search history.

(56) References Cited

U.S. PATENT DOCUMENTS

2010/0132785 A1 6/2010 Morooka et al.
2012/0103400 A1* 5/2012 Chiba .................. H01G 9/2081
136/251

FOREIGN PATENT DOCUMENTS

EP 2 221 909 A1 8/2010
EP 2 276 102 A1 1/2011
(Continued)

OTHER PUBLICATIONS

Communication, dated Apr. 5, 2016, from the European Patent Office in counterpart European application No. 13832961.0.
(Continued)

*Primary Examiner* — Shannon M Gardner
(74) *Attorney, Agent, or Firm* — Sughrue Mion, PLLC

(57) ABSTRACT

The dye-sensitized solar cell element includes at least one dye-sensitized solar cell (DSC), a first current extracting portion and a second current extracting portion for extracting current from the at least one DSC. The DSC comprises a first electrode having a transparent substrate and a transparent conductive layer provided on the surface of the substrate, a second electrode facing the first electrode and having a metal substrate, an oxide semiconductor layer provided on the first electrode, and an annular sealing portion bonding the first electrode with the second electrode. The first current extracting portion is included in the conductive film of one DSC of the at least one DSC, the second current extracting portion is connected with the metal substrate of the second electrode of one DSC of the at least one DSC, and the first and second current extracting portions are disposed next to each other.

18 Claims, 12 Drawing Sheets

(56) References Cited

FOREIGN PATENT DOCUMENTS

| EP | 2 683 020 A1 | 1/2014 |
|---|---|---|
| JP | 11-061055 A | 3/1999 |
| JP | 2005-216663 A | 8/2005 |
| JP | 2006-294423 A | 10/2006 |
| JP | 2008-186763 A | 8/2008 |
| JP | 2010-198823 A | 9/2010 |
| JP | 201148974 A1 | 3/2011 |
| JP | 2012-009374 A | 1/2012 |
| JP | 2012-182040 A | 9/2012 |
| WO | 2009/075267 A1 | 6/2009 |
| WO | 2009/133689 A1 | 11/2009 |
| WO | 2012/118028 A1 | 9/2012 |

OTHER PUBLICATIONS

International Search Report for PCT/JP2013/073453 dated Nov. 19, 2013 [PCT/ISA/210].
Written Opinion for PCT/JP2013/073453 dated Nov. 19, 2013 [PCT/ISA/237].
Communication dated Feb. 9, 2016 from the Japanese Patent Office in corresponding Japanese Application No. 2014-533140.
Japanese Office Action dated Sep. 29, 2015 in Japanese Patent Application No. 2014-533140.
Communication dated Jul. 5, 2016 from the State Intellectual Property Office of the P.R.C. in counterpart Application No. 201380032260.0.

\* cited by examiner

DYE-SENSITIZED SOLAR CELL ELEMENT FOR LOW ILLUMINANCE

CROSS REFERENCE TO RELATED APPLICATIONS

This application is a National Stage of International Application No. PCT/JP2013/073453 filed Aug. 31, 2013, claiming priority based on Japanese Patent Application Nos. 2012-192707, 2012-192706 and 2012-192704 all filed Sep. 1, 2012, the contents of all of which are incorporated herein by reference in their entirety.

TECHNICAL FIELD

The present invention relates to a dye-sensitized solar cell element for low illuminance.

BACKGROUND ART

As a photoelectric conversion element, a dye-sensitized solar cell element has attracted attention since it is inexpensive and a high photoelectric conversion efficiency can be obtained, and various developments have been conducted with regard to the dye-sensitized solar cell element.

The dye-sensitized solar cell element is generally equipped with at least one dye-sensitized solar cell, and each dye-sensitized solar cell is equipped with a working electrode, a counter electrode, and an annular sealing portion to couple the working electrode and the counter electrode. In addition, the working electrode has a transparent substrate, a transparent conductive layer formed thereon, and an oxide semiconductor layer provided on the transparent conductive layer.

As such a dye-sensitized solar cell element, for example, an element described in the following Patent Document 1 is known. In the following Patent Document 1, a dye-sensitized solar cell module having a plurality of dye-sensitized solar cells connected in series is disclosed. In the dye-sensitized solar cell module of the following Patent Document 1, an extracting electrode is connected with the counter electrode of one dye-sensitized solar cell of the dye-sensitized solar cells at both ends of the plurality of dye-sensitized solar cells and an extracting electrode is connected with the conductive film of the other dye-sensitized solar cell. Here, the two extracting electrodes are disposed so as to extend toward directions opposite to each other.

In addition, as a dye-sensitized solar cell element, for example, an element described in the following Patent Document 2 is known. In the following Patent Document 2, a dye-sensitized solar cell module is disclosed in which a conductive member extending from a counter electrode of one dye-sensitized solar cell is connected with a transparent conductive layer of the other dye-sensitized solar cell between adjacent sealing portions in two adjacent dye-sensitized solar cells.

CITATION LIST

Patent Document

Patent Document 1: JP 2012-9374 A
Patent Document 2: WO 2009/133689 A

SUMMARY OF THE INVENTION

Problem to be Solved by the Invention

Incidentally, in recent years, a dye-sensitized solar cell element has been used not only as an outdoor purpose but also under a low illuminance such as the interior of a building, and the development of the dye-sensitized solar cell element suitable for the use under a low illuminance has also been advanced. The dye-sensitized solar cell element for low illuminance is intended to be mainly used indoors, and thus it is significantly important for the dye-sensitized solar cell element for low illuminance to achieve space saving.

However, in the dye-sensitized solar cell module described in Patent Document 1 above, two extracting electrodes are disposed so as to extend toward the directions opposite to each other. For this reason, it is necessary to prepare two connectors and to connect each of the two connectors and each of the two extracting electrodes in order to extract current from the extracting electrodes in the dye-sensitized solar cell module described in Patent Document 1 above. For this reason, the space for accommodating two connectors is necessary when the dye-sensitized solar cell module is installed. Consequently, there is a room for improvement in terms of space saving in the dye-sensitized solar cell module described in Patent Document 1 above in the case of intending the use under a low illuminance.

On the other hand, it is also required for the dye-sensitized solar cell module for low illuminance to exhibit excellent photoelectric conversion characteristics.

In addition, a dye-sensitized solar cell module is housed in a case having an opening in some cases. In this case, the dye-sensitized solar cell module is disposed such that the light receiving surface of all the dye-sensitized solar cells is placed on the inner side of the opening. Hence, the aperture ratio is higher as the total area of the light receiving surface occupied in the area of the inner side of the opening is greater.

As described above, it is required to have a high aperture ratio for not only a dye-sensitized solar cell module used outdoors but also a dye-sensitized solar cell module having a small size so that the current generated by one dye-sensitized solar cell is less than 500 mA, a dye-sensitized solar cell module used in the place under a relatively low illuminance such as an interior of a building, or the like. Particularly, the dye-sensitized solar cell module having a small size or the dye-sensitized solar cell module used in the place under a relatively low illuminance has a smaller light receiving area and a smaller amount of received light compared to the dye-sensitized solar cell module used outdoors. For this reason, it is required for the dye-sensitized solar cell module to have particularly a high aperture ratio so that power generation is efficiently performed.

However, in the dye-sensitized solar cell module described in Patent Document 2 above, a conductive member extending from the counter electrode of one dye-sensitized solar cell of two adjacent dye-sensitized solar cells is connected with the transparent conductive layer of the other dye-sensitized solar cell between the adjacent sealing portions. In other words, the connecting place in which the edge portion of the counter electrode is connected with the transparent conductive layer is present in the light receiving area of the inner side of the opening of the case described above. For this reason, the area as large as the connecting place does not contribute to the power generation and thus the aperture ratio decreases. Particularly, the area necessary for the connecting place in a dye-sensitized solar cell module having a large light receiving area is usually almost not different from that in a dye-sensitized solar cell module having a small light receiving area. For this reason, the aperture ratio decreases as the dye-sensitized solar cell module has a smaller light receiving area when the connecting place between two adjacent dye-sensitized solar cells is in the light receiving area. Here, it is considered to decrease the area of the connecting place in order to obtain a high aperture ratio. However, in this case, the bonding strength at the connecting place decreases and thus connection reliability is lowered. Consequently, it is difficult to obtain a higher aperture ratio in the dye-sensitized solar cell module described in Patent Document 1 above.

Thus, there is a room for improvement in terms of aperture ratio increase in the dye-sensitized solar cell module described in Patent Document 2 above.

In addition, in the dye-sensitized solar cell module described in Patent Document 2 above, the connection of the adjacent dye-sensitized solar cells is performed between the adjacent sealing portions. For this reason, a gap exists between the two adjacent sealing portions and each of the two adjacent sealing portions is exposed to the gap. For this reason, the moisture or air in the atmosphere is likely to penetrate to the inside of the dye-sensitized solar cell. Consequently, there is a room for improvement in terms of durability in the dye-sensitized solar cell module described in Patent Document 2.

The invention has been conducted in view of the above circumstances, and a first object thereof is to provide a dye-sensitized solar cell element for low illuminance which can achieve space saving while having excellent photoelectric conversion characteristics.

In addition, a second object of the invention is to provide a dye-sensitized solar cell element which can improve the aperture ratio and exhibits excellent durability.

Means for Solving Problem

The present inventors have conducted extensive investigations in order to accomplish the above first object. First, it is considered to decrease the number of connectors to be connected with the extracting electrode to one in order to achieve space saving of the dye-sensitized solar cell element. For that, two extracting electrodes of the dye-sensitized solar cell element may be disposed so as to be adjacent to each other. However, in the dye-sensitized solar cell module described in Patent Document 1 above, a part of the transparent conductive layer of one dye-sensitized solar cell of the dye-sensitized solar cells at both ends of the plurality of dye-sensitized solar cells is stretched, and the extracting electrode is provided on the tip of the stretched part and disposed so as to be adjacent to the extracting electrode connected with the other dye-sensitized solar cell of the dye-sensitized solar cells at both ends of the plurality of dye-sensitized solar cells in order that two extracting electrodes are disposed so as to be adjacent to each other. In this case, there is no particular problem as long as the resistance of the stretched part can be lowered even if the generated current amount increases. However, there is a limit on the attempt to lower the resistance of the transparent conductive layer when the generated current is too great. As a result, the photoelectric conversion characteristics deteriorate. For this reason, it has been considered that it is practically difficult to dispose two extracting electrodes so as to be adjacent to each other. However, the present inventors have considered that it might be possible to sufficiently suppress the deterioration of the photoelectric conversion characteristics even if two extracting electrodes of the dye-sensitized solar cell module are disposed so that they are adjacent to each other since the generated current is sufficiently low in a case in which the dye-sensitized solar cell module is used under a low illuminance. Accordingly, the present inventors have completed the invention.

In other words, the invention is a dye-sensitized solar cell element for low illuminance including at least one dye-sensitized solar cell, a first current extracting portion for extracting current from the at least one dye-sensitized solar cell, and a second current extracting portion for extracting current from the at least one dye-sensitized solar cell, in which the dye-sensitized solar cell is equipped with a first electrode having a transparent substrate and a transparent conductive layer provided on one surface of the transparent substrate, a second electrode facing the first electrode and having a metal substrate, an oxide semiconductor layer provided on the first electrode or the second electrode, and an annular sealing portion bonding the first electrode and the second electrode, the first current extracting portion is included in the transparent conductive layer of one dye-sensitized solar cell of the at least one dye-sensitized solar cell, the second current extracting portion is electrically connected with the metal substrate of the second electrode of one dye-sensitized solar cell of the at least one dye-sensitized solar cell, and the first current extracting portion and the second current extracting portion are disposed so as to be adjacent to each other.

According to this dye-sensitized solar cell element for low illuminance, the first current extracting portion and the second current extracting portion are disposed so as to be adjacent to each other. For this reason, it is possible to set the number of connector for extracting the current from the first current extracting portion and the second current extracting portion to the outside to one. That is to say, it is possible to integrate the connector for extracting the current from the first current extracting portion and the second current extracting portion to the outside. For this reason, according to the dye-sensitized solar cell element for low illuminance of the invention, it is possible to achieve space saving. In addition, the generated current is low when the dye-sensitized solar cell element for low illuminance of the invention is used under a low illuminance. For this reason, it is possible to sufficiently suppress the deterioration of the photoelectric conversion performance even if a part of the transparent conductive layer of one dye-sensitized solar cell of the at least one dye-sensitized solar cell is disposed next to the second current extracting portion electrically connected with the metal substrate of the second electrode of one dye-sensitized solar cell of the at least one dye-sensitized solar cell as the first current extracting portion.

The dye-sensitized solar cell element for low illuminance may be further equipped with a back sheet covering the at least one dye-sensitized solar cell on the one surface side of the transparent substrate.

In the dye-sensitized solar cell element for low illuminance, it is preferable that an insulating coupling portion be provided on the entire circumference of a peripheral portion of the back sheet, a separating portion connecting the transparent substrate and the coupling portion being provided so as to surround the transparent conductive layer of the at least one dye-sensitized solar cell and to form a gap with the transparent conductive layer be further included, and the separating portion be provided so as to form a cyclic structure together with the first current extracting portion and the second current extracting portion and a part of the gap be disposed on an inner side of the coupling portion.

In this case, the penetration of moisture into a part of the gap is prevented by the back sheet. For this reason, it is sufficiently prevented that moisture is attached to the transparent conductive layer by the moisture penetrated into the part of the gap. For this reason, it is sufficiently prevented that the short circuit occurs in the dye-sensitized solar cell.

In the dye-sensitized solar cell element for low illuminance, the first current extracting portion and the second current extracting portion may be disposed in the vicinity of one dye-sensitized solar cell of the at least one dye-sensitized solar cell, and the metal substrate of the second electrode of one dye-sensitized solar cell of the at least one dye-sensitized solar cell may be connected with the second current extracting portion by a second connecting portion.

In this case, for example, in a case in which the dye-sensitized solar cell element for low illuminance has a plurality of dye-sensitized solar cells arranged in a line along a fixed direction, it is possible to shorten the installation region of the connecting terminal provided along the plurality of dye-sensitized solar cells in order to connect two adjacent dye-sensitized solar cells compared to a case in which some of the dye-sensitized solar cells of the plurality of dye-sensitized solar cells are folded back in the middle and the dye-sensitized solar cell on one end side of the dye-sensitized solar cells at both ends of the plurality of dye-sensitized solar cells and the dye-sensitized solar cell on the other end side thereof are disposed so as to be adjacent to each other, and thus it is possible to achieve space saving to a greater extent. In addition, it is possible to select both an even number and an odd number as the number of dye-sensitized solar cell and thus it is possible to freely determine the number of dye-sensitized solar cell, and it is possible to improve the degree of freedom of the design as a result. In addition, according to the dye-sensitized solar cell element for low illuminance of the invention, the generated current is usually low in a case in which the dye-sensitized solar cell element for low illuminance is used in a low illuminance environment, and thus it is possible to sufficiently suppress the deterioration of the photoelectric conversion characteristics even if the dye-sensitized solar cell element for low illuminance of the invention further has the second connecting portion connecting the metal substrate of the second electrode of the dye-sensitized solar cell on the other end side and the second current extracting portion.

It is preferable that the dye-sensitized solar cell element for low illuminance be further equipped with a second current collecting wiring provided on the second connecting portion and having a lower resistance than the second connecting portion.

In this case, the second current collecting wiring has a lower resistance than the second connecting portion, and thus it is possible to sufficiently suppress the deterioration of the photoelectric conversion characteristics even if the generated current increases.

In the dye-sensitized solar cell element for low illuminance, it is preferable that the second collecting wiring be disposed so as not to intersect with the peripheral portion of the back sheet.

In this case, it is possible to prevent the water vapor or the like from penetrating from the outside into the space on the inner side of the back sheet through the second current collecting wiring when the second current collecting wiring is disposed so as not to intersect with the peripheral portion of the back sheet although the current collecting wiring generally exhibits air permeability since it is porous and thus gas such as water vapor is permeable through it. As a result, it is possible for the dye-sensitized solar cell element to exhibit excellent durability. In addition, the second current collecting wiring has a lower resistance than the transparent conductive layer, and thus it is possible to sufficiently suppress the deterioration of the photoelectric conversion characteristics even if the generated current increases.

In the dye-sensitized solar cell element for low illuminance, it is preferable that the second connecting portion be disposed on an inner side than the peripheral portion of the back sheet.

In this case, it is sufficiently suppressed that the moisture penetrates from the outer side of the back sheet into the inner side of the back sheet. For this reason, it is sufficiently prevented that the moisture is attached to the second connecting portion, and thus an increase in the resistance of the second connecting portion or the short circuit between the second connecting portion and the transparent conductive layer of the dye-sensitized solar cell is sufficiently prevented.

In the dye-sensitized solar cell element for low illuminance, the first current extracting portion and the second current extracting portion may be disposed in the vicinity of one dye-sensitized solar cell of the at least one dye-sensitized solar cell, and the transparent conductive layer of one dye-sensitized solar cell of the at least one dye-sensitized solar cell may further have a main body portion provided on an inner side of the annular sealing portion and a first connecting portion connecting the main body portion and the first current extracting portion.

In this case, for example, in a case in which the dye-sensitized solar cell element for low illuminance has a plurality of dye-sensitized solar cells arranged in a line along a fixed direction, it is possible to shorten the installation region of the connecting terminal provided along the plurality of dye-sensitized solar cells in order to connect two adjacent dye-sensitized solar cells compared to a case in which some of the dye-sensitized solar cells of the plurality of dye-sensitized solar cells are folded back in the middle, and the dye-sensitized solar cell on one end side of the dye-sensitized solar cells at both ends of the plurality of dye-sensitized solar cells and the dye-sensitized solar cell on the other end side thereof are disposed so as to be adjacent to each other, and thus it is possible to achieve space saving to a greater extent. In addition, it is possible to select both an even number and an odd number as the number of dye-sensitized solar cell and thus it is possible to freely determine the number of dye-sensitized solar cell, and it is possible to improve the degree of freedom of the design as a result. In addition, according to the dye-sensitized solar cell element for low illuminance of the invention, the generated current is usually low in a case in which the dye-sensitized solar cell element for low illuminance is used in a low illuminance environment, and thus it is possible to sufficiently suppress the deterioration of the photoelectric conversion characteristics even if the dye-sensitized solar cell element for low illuminance of the invention further has the first connecting portion connecting the main body portion and the first current extracting portion.

It is preferable that the dye-sensitized solar cell element for low illuminance be further equipped with a first current collecting wiring provided at least on the first connecting portion of one dye-sensitized solar cell of the at least one dye-sensitized solar cell along the first connecting portion and having a lower resistance than the first connecting portion.

In this case, the first current collecting wiring has a lower resistance than the first connecting portion, and thus it is possible to sufficiently suppress the deterioration of the photoelectric conversion characteristics even if the generated current increases.

In the dye-sensitized solar cell element for low illuminance, it is preferable that the first current collecting wiring be disposed so as not to intersect with the peripheral portion of the back sheet.

In this case, it is possible to prevent the water vapor or the like from penetrating from the outside into the space on the inner side of the back sheet through the first current collecting wiring when the first current collecting wiring is disposed so as not to intersect with the peripheral portion of the back sheet although the current collecting wiring generally exhibits air permeability since it is porous and thus gas such as water vapor is permeable through it. As a result, it is possible for the dye-sensitized solar cell element to exhibit excellent durability. In addition, the first current collecting wiring has a lower resistance than the transparent conductive layer, and thus it is possible to sufficiently suppress the deterioration of the photoelectric conversion characteristics even if the generated current increases.

In addition, it is preferable that the dye-sensitized solar cell element for low illuminance have a plurality of the dye-sensitized solar cells, and the transparent substrate be constituted by a common transparent substrate of the plurality of dye-sensitized solar cell, the second electrodes of two adjacent dye-sensitized solar cells be spaced apart from each other, the sealing portion have an annular first sealing portion provided between the first electrode and the second electrode, the first sealing portions of two adjacent dye-sensitized solar cells be integrated to constitute a first integrated sealing portion, the first integrated sealing portion have an annular portion and a partitioning portion partitioning an opening in the annular portion, and a width of an adhesive portion of the partitioning portion of the first integrated sealing portion with a surface on the first electrode side of the second electrode be narrower than a width of an adhesive portion of the annular portion of the first integrated sealing portion with a surface on the first electrode side of the second electrode.

According to this dye-sensitized solar cell element, the width of the adhesive portion of the partitioning portion of the first integrated sealing portion with the surface on the first electrode side of the second electrode is narrower than the width of the adhesive portion of the annular portion of the first integrated sealing portion with the surface on the first electrode side of the second electrode. For this reason, it is possible to more sufficiently improve the aperture ratio of the dye-sensitized solar cell element. In addition, in the dye-sensitized solar cell element of the invention, the first sealing portions of two adjacent dye-sensitized solar cells are integrated to constitute the first integrated sealing portion. Here, the first sealing portion which is exposed to the atmosphere is in two places in between the adjacent dye-sensitized solar cells when the first sealing portions of two adjacent dye-sensitized solar cells are not integrated. In contrast to this, in the dye-sensitized solar cell element, the adjacent first sealing portions are integrated to constitute the first integrated sealing portion and thus the first sealing portion which is exposed to the atmosphere is in one place in between the adjacent dye-sensitized solar cells. In other words, the sealing portion which is exposed to the atmosphere is in only one place of the partitioning portion of the first integrated sealing portion in between the adjacent dye-sensitized solar cells. In addition, the penetration distance of moisture or the like from the atmosphere to the electrolyte increases when the first sealing portions are integrated. For this reason, it is possible to sufficiently reduce the amount of moisture or air penetrating from the outside of the dye-sensitized solar cell in between the adjacent dye-sensitized solar cells. In other words, it is possible to sufficiently improve the sealing ability of the dye-sensitized solar cell element. In addition, according to the dye-sensitized solar cell element, the adjacent first sealing portions are integrated. For this reason, even if the width of the adhesive portion of the partitioning portion of the first integrated sealing portion with the surface on the first electrode side of the second electrode is narrower than the width of the adhesive portion of the annular portion of the first integrated sealing portion with the surface on the first electrode side of the second electrode, it is possible to secure a sufficient sealing width at the partitioning portion. In other words, according to the dye-sensitized solar cell element of the invention, it is possible to sufficiently increase the bonding strength of the first sealing portion with the first electrode and the bonding strength of the first sealing portion with the second electrode while improving the aperture ratio. As a result, it is possible to improve the aperture ratio as well as it is possible to sufficiently suppress the peeling of the first sealing portion from the first electrode and the second electrode even if the electrolyte expands and thus an excessive stress directed from the inner side to the outer side of the first sealing portion is applied in the case of using the dye-sensitized solar cell element under a high temperature, and thus it is possible to exhibit excellent durability.

In the dye-sensitized solar cell element, it is preferable that a width of the partitioning portion be 100% or more and less than 200% of a width of the annular portion.

In this case, the width of the partitioning portion is 100% or more of the width of the annular portion in the partitioning portion of the first integrated sealing portion, and thus the penetration distance of moisture or the like from the atmosphere to the electrolyte increases compared to a case in which the width of the partitioning portion is less than 100% of the width of the annular portion. For this reason, it is possible to more sufficiently suppress that the moisture penetrates from the outside through the partitioning portion present between the adjacent dye-sensitized solar cells. On the other hand, it is possible to more improve the aperture ratio compared to a case in which the width of the partitioning portion exceeds 200% of the width of the annular portion.

In the dye-sensitized solar cell element, it is preferable that the sealing portion of the plurality of dye-sensitized solar cells further have an annular second sealing portion which is provided so as to be superimposed on the first sealing portion and which sandwiches an edge portion of the second electrode together with the first sealing portion, and the second sealing portion be integrated to constitute a second integrated sealing portion.

In this case, the peeling can be sufficiently suppressed by the second sealing portion or the second integrated sealing portion even if the stress in the direction apart from the first electrode with respect to the second electrode is applied.

In addition, it is preferable that the dye-sensitized solar cell element for low illuminance have a plurality of dye-sensitized solar cells, and the plurality of dye-sensitized solar cells be connected in series and electrically, the dye-sensitized solar cell connected with an adjacent dye-sensitized solar cell among the plurality of the dye-sensitized solar cells be further equipped with a connecting terminal provided on the transparent conductive layer, the transparent conductive layer have a main body portion provided on an inner side of the annular sealing portion and a protruding portion which protrudes from the main body portion to an outer side of the sealing portion and on which the connecting terminal is provided, the connecting terminal of one dye-sensitized solar cell of two adjacent dye-sensitized solar cells be connected with the metal substrate of the second electrode of the other dye-sensitized solar cell via a conductive material, the connecting terminal have a conductive material connecting portion connected with the conductive material and extending on an outer side of the sealing portion along a fixed direction and a conductive material non-connecting portion extending from the conductive material connecting portion on an outer side of the sealing portion along a fixed direction, and a width of the conductive material non-connecting portion be narrower than a width of the conductive material connecting portion.

In a case in which the dye-sensitized solar cell element is placed in an environment in which the temperature change is great, the connecting terminal more easily peels off from the protruding portion of the transparent conductive layer as the width of the connecting terminal provided on the protruding portion of the transparent conductive layer is wider. With regard to that point, in the dye-sensitized solar cell element of the invention, the conductive material non-connecting portion of the connecting terminal has a narrower width than the conductive material connecting portion connected with the conductive material. For this reason, the conductive material non-connecting portion of the connecting terminal is less likely to peel off from the protruding portion of the transparent conductive layer. Hence, the conductive material non-connecting portion does not peel off from the protruding portion of the transparent conductive layer and thus it is possible to maintain the connection with the protruding portion even if the conductive material connecting portion peels off from the protruding portion of the transparent conductive layer. In addition, it is possible to normally operate the dye-sensitized solar cell element even if the conductive material connecting portion peels off from the protruding portion of the transparent conductive layer. Consequently, according to the dye-sensitized solar cell element of the invention, it is possible to improve the connection reliability. In addition, the conductive material connected with the metal substrate of the second electrode of one dye-sensitized solar cell of two adjacent dye-sensitized solar cells is connected with the conductive material connecting portion on the protruding portion of the other dye-sensitized solar cell, and the conductive material connecting portion is provided on the protruding portion and the outer side of the sealing portion. In other words, the connection of two adjacent dye-sensitized solar cells is performed on the outer side of the sealing portion. For this reason, according to the dye-sensitized solar cell element of the invention, it is possible to improve the aperture ratio.

In addition, the present inventors have conducted extensive investigations in order to accomplish the above second object, and as a result, they have found that the above second object can be accomplished by the following invention.

In other words, the invention is a dye-sensitized solar cell element including a dye-sensitized solar cell module which has a plurality of dye-sensitized solar cells, and, the dye-sensitized solar cell is equipped with a first electrode, a second electrode facing the first electrode, an oxide semiconductor layer provided on the first electrode or the second electrode, an annular sealing portion bonding the first electrode and the second electrode, and an electrolyte disposed in a space surrounded by the first electrode, the second electrode, and the sealing portion, the transparent substrate is constituted by a common transparent substrate of the plurality of dye-sensitized solar cells, the second electrodes of two adjacent dye-sensitized solar cells are spaced apart from each other, the sealing portion has an annular first sealing portion provided between the first electrode and the second electrode, the first sealing portions of two adjacent dye-sensitized solar cells are integrated to constitute the first integrated sealing portion, the first integrated sealing portion has an annular portion and a partitioning portion partitioning an opening inside the annular portion, and a width of an adhesive portion of the partitioning portion of the first integrated sealing portion with a surface on the first electrode side of the second electrode is narrower than a width of an adhesive portion of the annular portion of the first integrated sealing portion with a surface on the first electrode side of the second electrode.

According to this dye-sensitized solar cell element, the width of the adhesive portion of the partitioning portion of the first integrated sealing portion with the surface on the first electrode side of the second electrode is narrower than the width of the adhesive portion of the annular portion of the first integrated sealing portion with the surface on the first electrode side of the second electrode. For this reason, it is possible to more sufficiently improve the aperture ratio of the dye-sensitized solar cell element. In addition, in the dye-sensitized solar cell element of the invention, the first sealing portions of two adjacent dye-sensitized solar cells are integrated to constitute a first integrated sealing portion. Here, the first sealing portion which is exposed to the atmosphere is in two places in between the adjacent dye-sensitized solar cells when the first sealing portions of the two adjacent dye-sensitized solar cells are not integrated. In contrast to this, in the dye-sensitized solar cell element, the adjacent first sealing portions are integrated to constitute the first integrated sealing portion and thus the first sealing portion which is exposed to the atmosphere is in one place in between the adjacent dye-sensitized solar cells. In other words, the sealing portion which is exposed to the atmosphere is in only one place of the partitioning portion of the first integrated sealing portion in between the adjacent dye-sensitized solar cells. In addition, the penetration distance of moisture or the like from the atmosphere to the electrolyte increases since the first sealing portions are integrated. For this reason, it is possible to sufficiently reduce the amount of moisture or air penetrating from the outside of the dye-sensitized solar cell in between the adjacent dye-sensitized solar cells. In other words, it is possible to sufficiently improve the sealing ability of the dye-sensitized solar cell element. In addition, according to the dye-sensitized solar cell element, the adjacent first sealing portions are integrated. For this reason, even if the width of the adhesive portion of the partitioning portion of the first integrated sealing portion with the surface on the first electrode side of the second electrode is narrower than the width of the adhesive portion of the annular portion of the first integrated sealing portion with the surface on the first electrode side of the second electrode, it is possible to secure a sufficient sealing width at the partitioning portion. In other words, according to the dye-sensitized solar cell element of the invention, it is possible to sufficiently increase the bonding strength of the first sealing portion with the first electrode and the bonding strength of the first sealing portion with the second electrode while improving the aperture ratio. As a result, it is possible to improve the aperture ratio as well as it is possible to sufficiently suppress the peeling of the first sealing portion from the first electrode and the second electrode even if the electrolyte expands and thus an excessive stress directed from the inner side to the outer side of the first sealing portion is applied in the case of using the dye-sensitized solar cell element under a high temperature, and thus it is possible to exhibit excellent durability.

In the dye-sensitized solar cell element, it is preferable that a width of the partitioning portion be 100% or more and less than 200% of a width of the annular portion.

In this case, the width of the partitioning portion is 100% or more of the width of the annular portion in the partitioning portion of the first integrated sealing portion, and thus the penetration distance of moisture or the like from the atmosphere to the electrolyte increases compared to a case in which the width of the partitioning portion is less than 100% of the width of the annular portion. For this reason, it is possible to more sufficiently suppress that the moisture penetrates from the outside through the partitioning portion present between the adjacent dye-sensitized solar cells. On the other hand, it is possible to more improve the aperture ratio compared to a case in which the width of the partitioning portion exceeds 200% of the width of the annular portion.

In the dye-sensitized solar cell element, it is preferable that the sealing portion of the plurality of dye-sensitized solar cells further have an annular second sealing portion which is provided so as to be superimposed on the first sealing portion and which sandwiches an edge portion of the second electrode together with the first sealing portion, and the second sealing portions be integrated to constitute a second integrated sealing portion.

In this case, the peeling can be sufficiently suppressed by the second sealing portion or the second integrated sealing portion even if the stress in the direction away from the first electrode with respect to the second electrode is applied.

In the dye-sensitized solar cell element, it is preferable that a width of an adhesive portion of the partitioning portion of the first integrated sealing portion with a surface on the first electrode side of the second electrode be 25% or more and less than 100% of a width of an adhesive portion of the annular portion of the first integrated sealing portion with a surface on the first electrode side of the second electrode.

In this case, it is possible to exhibit more excellent durability compared to a case in which the width P of the adhesive portion is less than 25% of the width Q of the adhesive portion.

Meanwhile, in the invention, the "low illuminance" refers to an illuminance of 10000 lux or less.

Effect of the Invention

According to the invention, a dye-sensitized solar cell element for low illuminance which can achieve space saving while exhibiting excellent photoelectric conversion characteristics is provided.

MODE(S) FOR CARRYING OUT THE INVENTION

Figure 1:
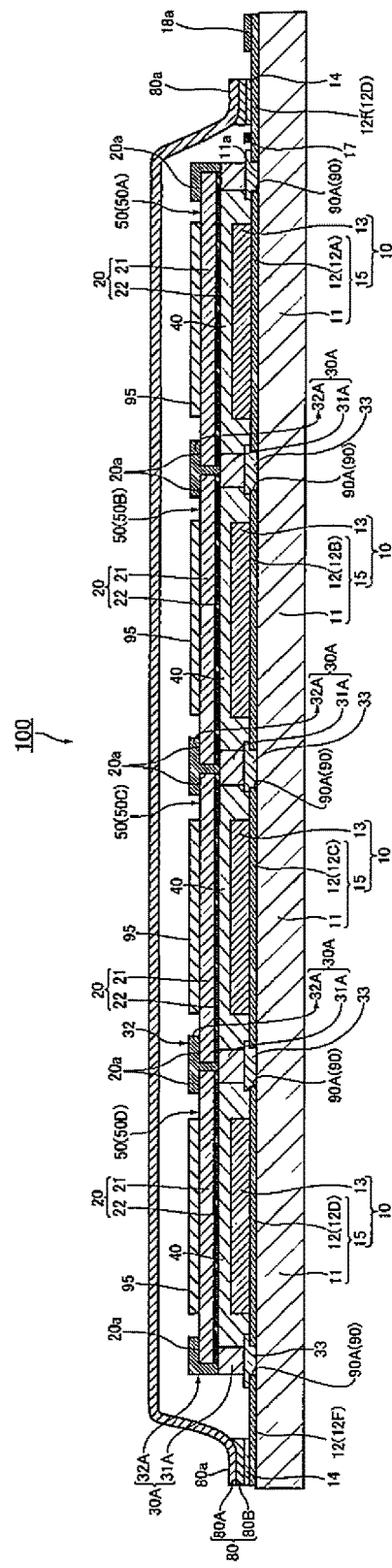
FIG. 1 is an end view of the cut section illustrating a first embodiment of a dye-sensitized solar cell element of the invention.
Figure 2:
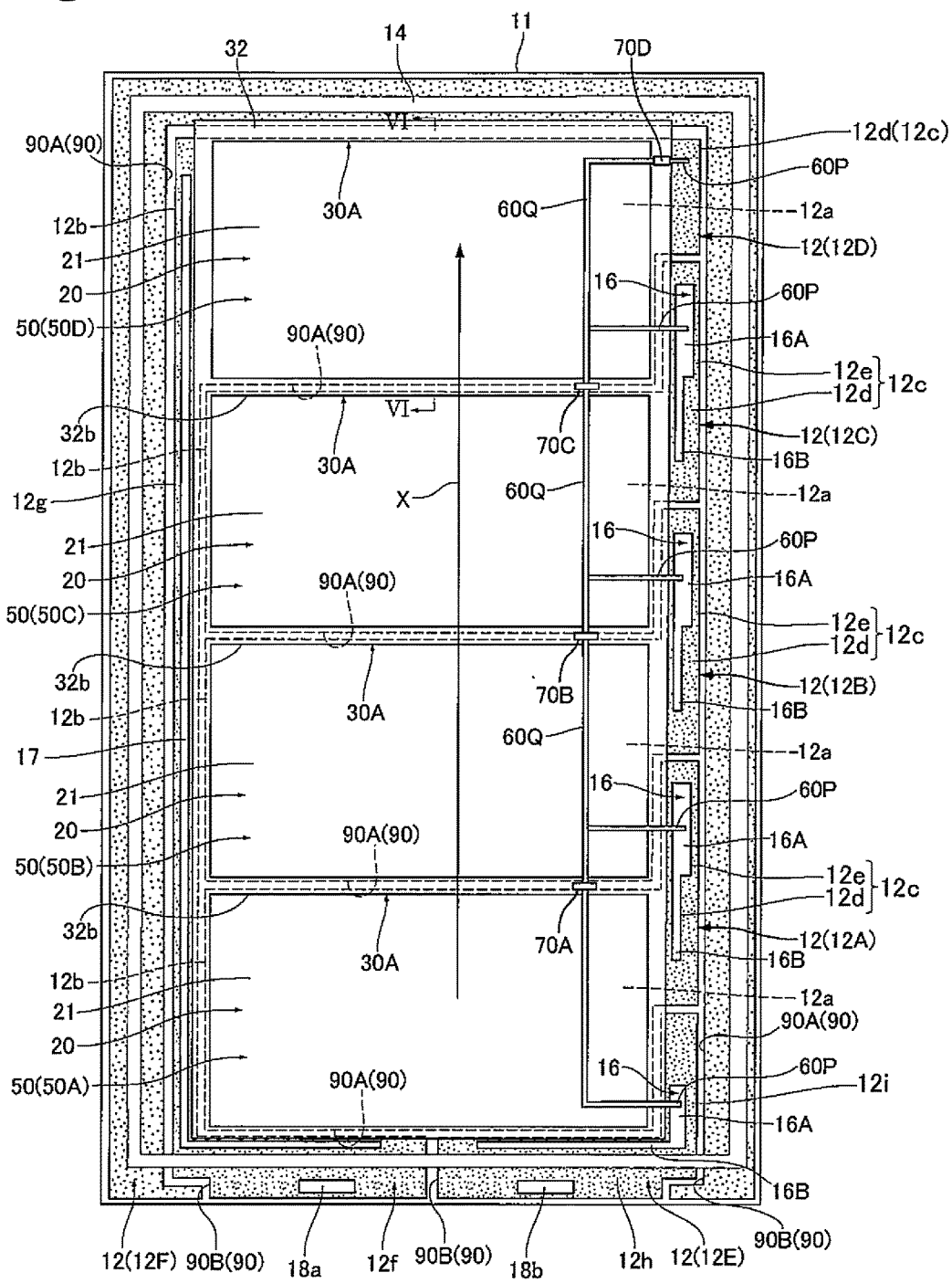
FIG. 2 is a plan view illustrating a part of a first embodiment of a dye-sensitized solar cell element of the invention.
Figure 3:
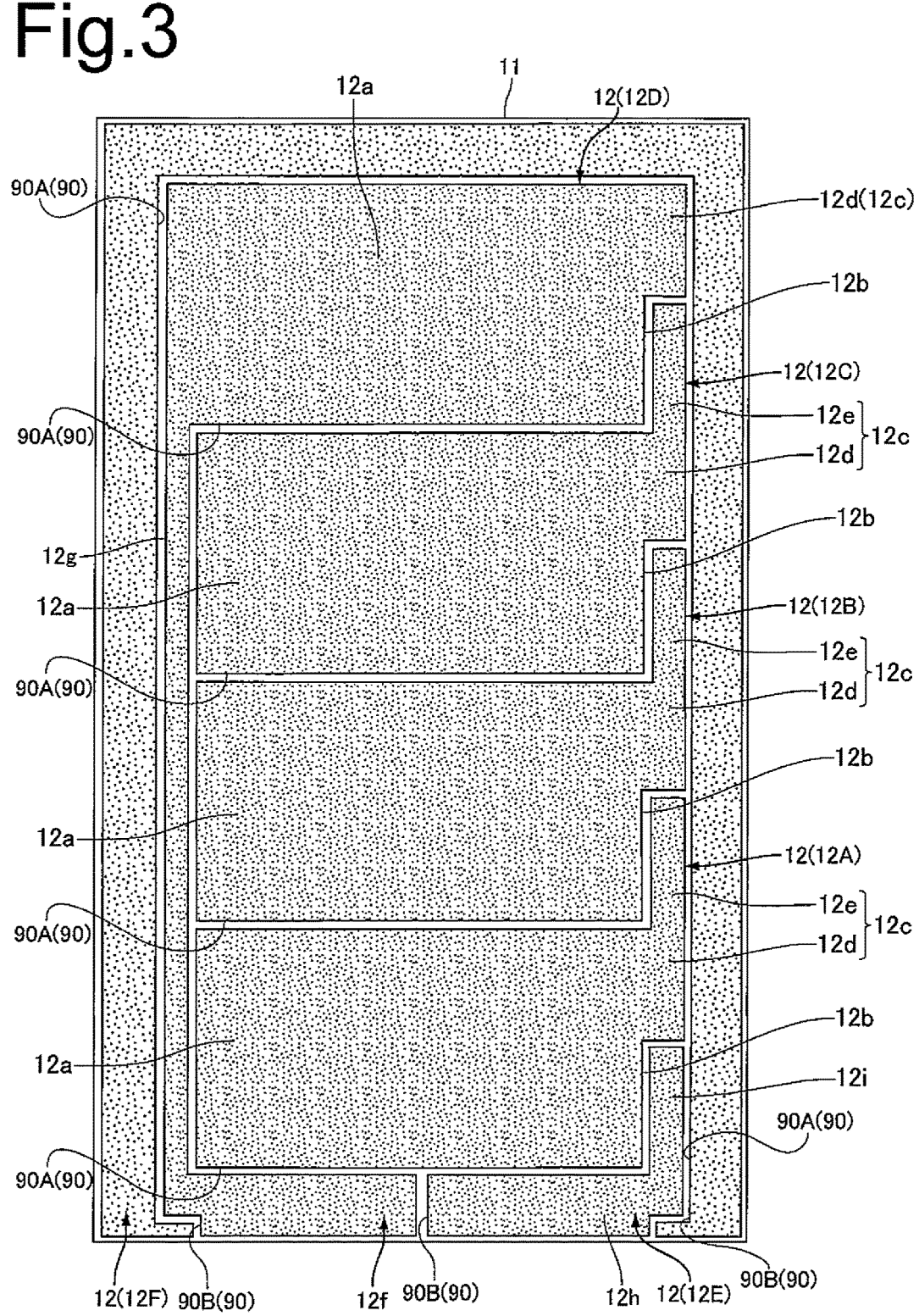
FIG. 3 is a plan view illustrating a pattern of a transparent conductive layer of a dye-sensitized solar cell element of FIG. 1.
Figure 4:
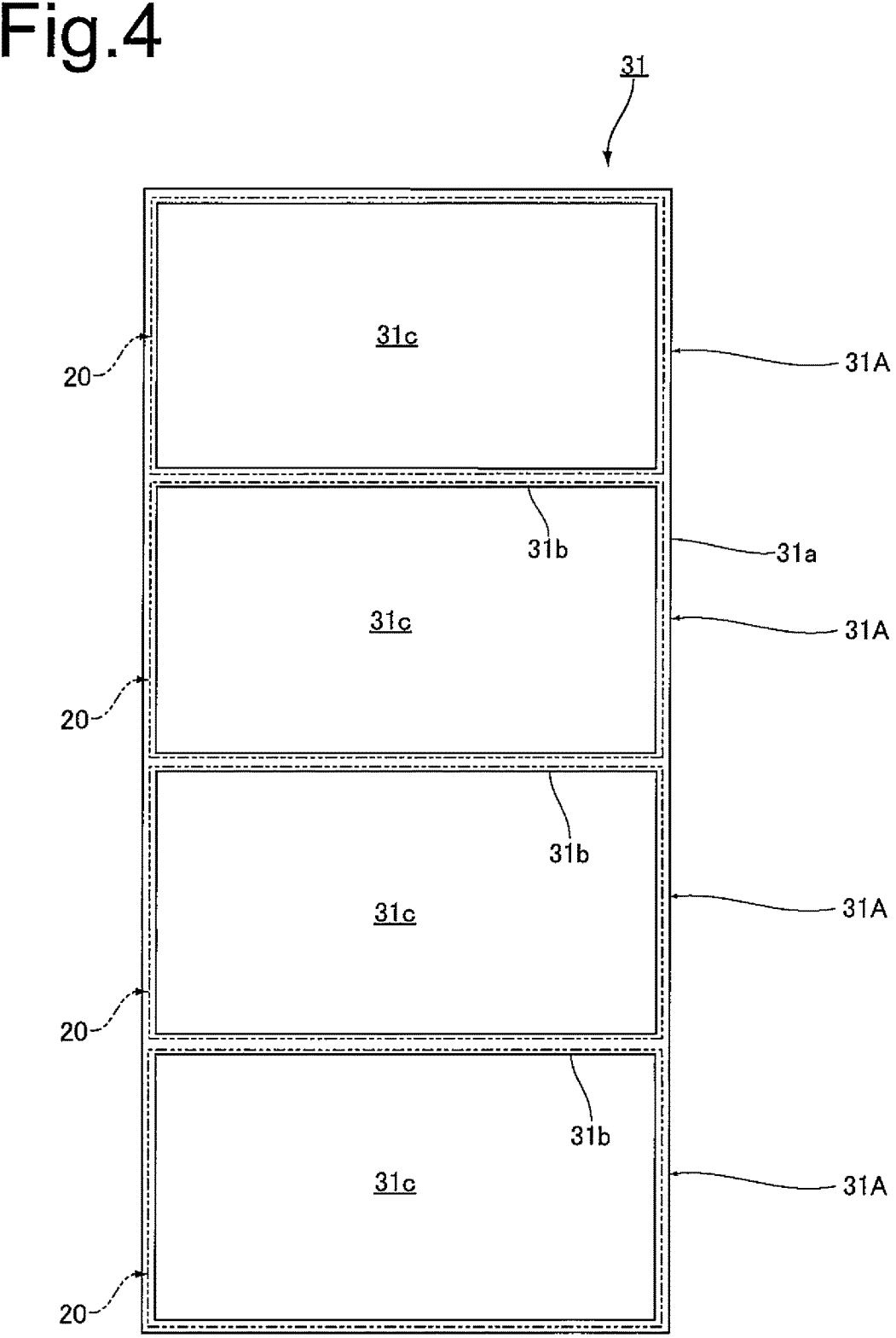
FIG. 4 is a plan view illustrating a first integrated sealing portion of FIG. 1.
Figure 5:
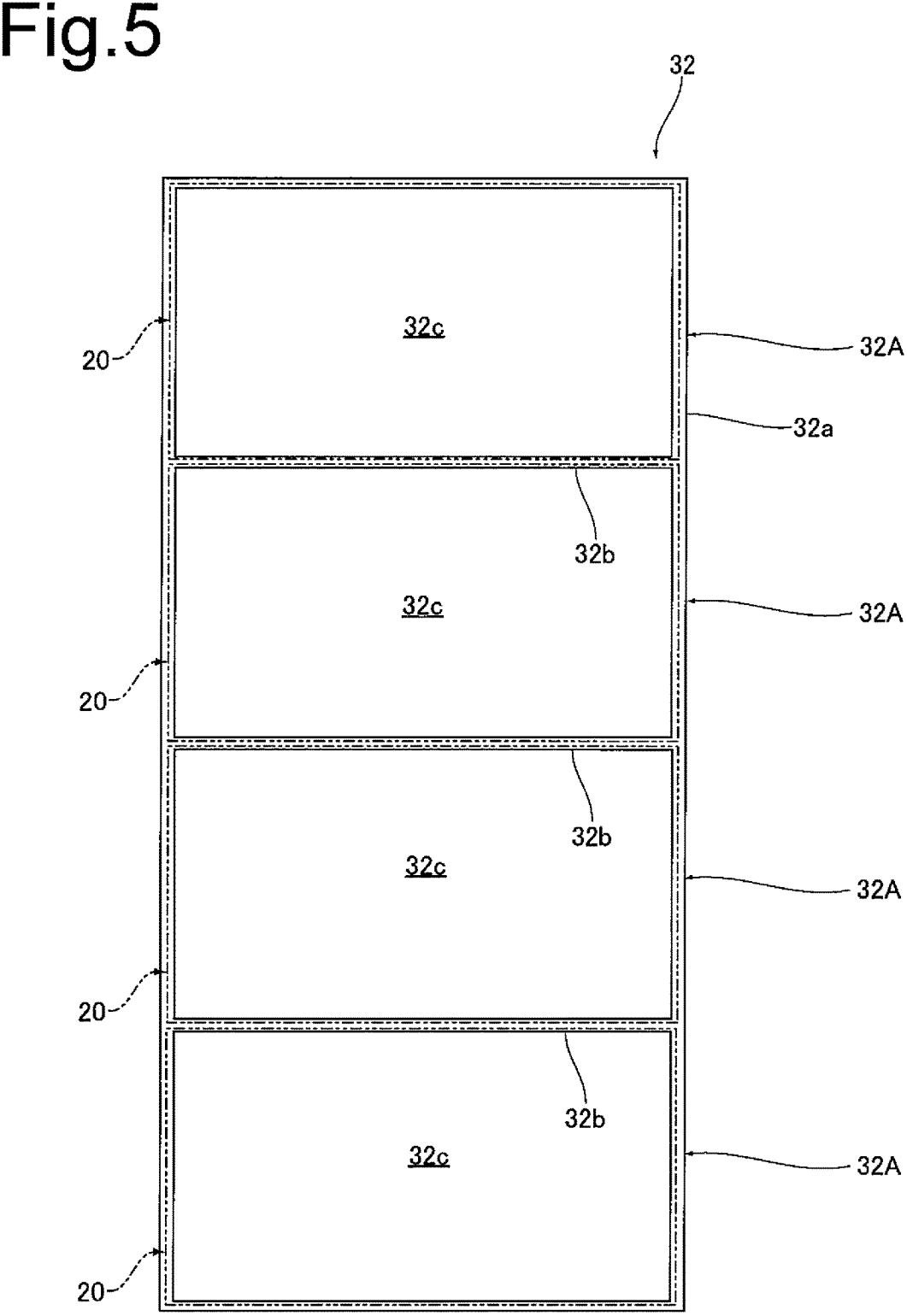
FIG. 5 is a plan view illustrating a second integrated sealing portion of FIG. 1.
Figure 6:
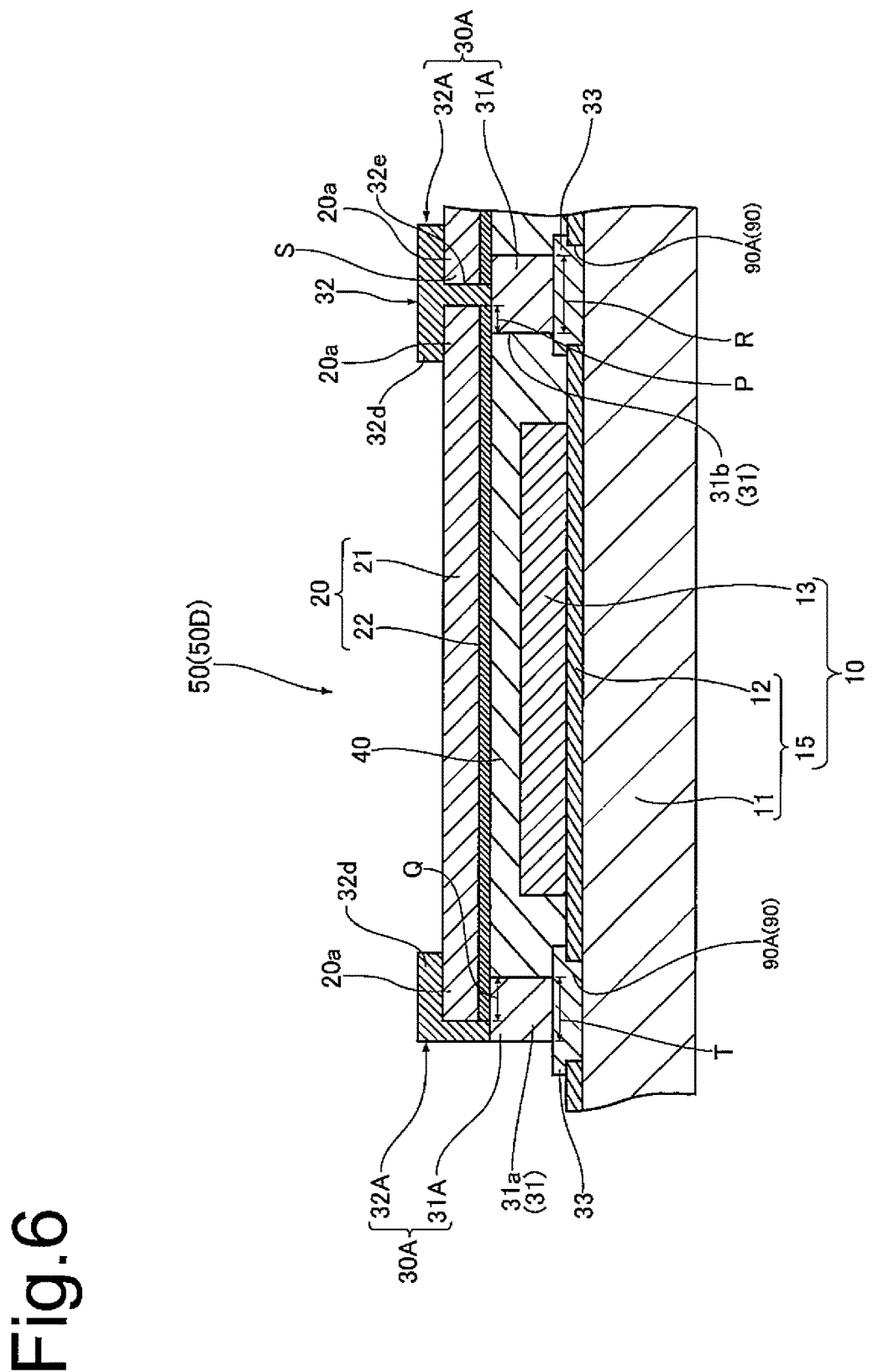
FIG. 6 is an end view of the cut section along the line VI-VI in FIG. 2.

Hereinafter, preferred embodiments of the dye-sensitized solar cell element of the invention will be described in detail with reference to FIG. 1 to FIG. 6. FIG. 1 is an end view of the cut section illustrating a first embodiment of a dye-sensitized solar cell element of the invention, FIG. 2 is a plan view illustrating a part of a first embodiment of a dye-sensitized solar cell element of the invention, FIG. 3 is a plan view illustrating a pattern of a transparent conductive layer of a dye-sensitized solar cell element of FIG. 1, FIG. 4 is a plan view illustrating a first integrated sealing portion of FIG. 1, FIG. 5 is a plan view illustrating a second integrated sealing portion of FIG. 1, and FIG. 6 is an end view of the cut section along the line VI-VI in FIG. 2.

As illustrated in FIG. 1, a dye-sensitized solar cell module for low illuminance (hereinafter, referred to as the "DSC Module" in some cases) 100 as a dye-sensitized solar cell element has a plurality (four in FIG. 1) of dye-sensitized solar cells (hereinafter, referred to as the "DSC" in some cases) 50 having a transparent substrate 11 and a back sheet 80 which is provided so as to cover the DSC 50 on the side of one surface 11a of the transparent substrate 11. An insulating coupling portion 14 is provided on the entire circumference of a peripheral portion 80a of the back sheet 80. As illustrated in FIG. 2, the plurality of DSCs 50 are connected in series by a conductive material 60P. Hereinafter, for convenience of description, the four DSCs 50 of the DSC module 100 are referred to as DSCs 50A to 50D in some cases.

As illustrated in FIG. 1, each of the plurality of DSCs 50 is equipped with a working electrode 10, a counter electrode 20 facing the working electrode 10, and an annular sealing portion 30A bonding the working electrode 10 and the counter electrode 20. An electrolyte 40 is filled in the cell space formed by the working electrode 10, the counter electrode 20, and the annular sealing portion 30A.

The counter electrode 20 is equipped with a metal substrate 21 and a catalyst layer 22 which is provided to the working electrode 10 side of the metal substrate 21 and promotes the catalytic reaction. In addition, in two adjacent DSCs 50, the counter electrodes 20 are spaced apart from each other. In the present embodiment, the second electrode is constituted by the counter electrode 20.

As illustrated in FIG. 1 and FIG. 2, the working electrode 10 has a transparent conductive substrate 15 having a transparent substrate 11, a transparent conductive layer 12 provided on the one surface 11a of the transparent substrate 11 and an insulating material 33 provided on the one surface 11a of the transparent substrate 11, at least one oxide semiconductor layer 13 provided on the transparent conductive layer 12 of the transparent conductive substrate 15, and a connecting terminal 16 provided on the transparent conductive layer 12. The oxide semiconductor layer 13 is disposed on the inner side of the annular sealing portion 30A. The transparent substrate 11 is used as the common transparent substrate of the DSCs 50A to 50D. Meanwhile, in the present embodiment, a first electrode is constituted by the transparent conductive substrate 15.

As illustrated in FIG. 2 and FIG. 3, the transparent conductive layer 12 is constituted by the transparent conductive layers 12A to 12F provided in a state of being insulated from each other. In other words, the transparent conductive layers 12A to 12F are disposed to interpose a groove 90 between one another. Here, the transparent conductive layers 12A to 12D constitute the transparent conductive layer 12 of the plurality of DSCs 50A to 50D, respectively. In addition, the transparent conductive layer 12E is disposed so as to bend along the sealing portion 30A. The transparent conductive layer 12F is the annular transparent electrode film 12 for fixing the peripheral portion 80a of the back sheet 80 and constitutes a separating portion (see FIG. 2).

As illustrated in FIG. 3, all of the transparent conductive layers 12A to 12D have a quadrangular-shaped main body portion 12a having a side edge portion 12b and a protruding portion 12c which laterally protrudes from the side edge portion 12b of the main body portion 12a.

As illustrated in FIG. 2, the protruding portion 12c of the transparent conductive layer 12C among the transparent conductive layers 12A to 12D has a projecting portion 12d which laterally projects with respect to the arrangement direction X of the DSCs 50A to 50D and a facing portion 12e which extends from the projecting portion 12d and faces the main body portion 12a of the adjacent DSC 50D via the groove 90.

In the DSC 50B, the protruding portion 12c of the transparent conductive layer 12B has the projecting portion 12d and the facing portion 12e. In addition, in the DSC 50A as well, the protruding portion 12c of the transparent conductive layer 12A has the projecting portion 12d and the facing portion 12e.

Meanwhile, the DSC 50D is connected with the DSC 50C already and there is no other DSC 50 to be connected. For this reason, in the DSC 50D, the protruding portion 12c of the transparent conductive layer 12D does not have a facing portion 12e. In other words, the protruding portion 12c of the transparent conductive layer 12D is constituted by only the projecting portion 12d.

However, the transparent conductive layer 12D further has a first current extracting portion 12f for extracting the current generated in the DSC module 100 to the outside and a first connecting portion 12g which connects the first current extracting portion 12f with the main body portion 12a and extends along the side edge portion 12b of the transparent conductive layers 12A to 12C. The first current extracting portion 12f is disposed in the vicinity of the DSC 50A and on the side opposite to the transparent conductive layer 12B with respect to the transparent conductive layer 12A.

On the other hand, the transparent conductive layer 12E also has a second current extracting portion 12h for extracting the current generated in the DSC module 100 to the outside, and the second current extracting portion 12h is disposed in the vicinity of the DSC 50A and on the side opposite to the transparent conductive layer 12B with respect to the transparent conductive layer 12A. In addition, the transparent conductive layer 12E further has a second connecting portion 12i connecting the second current extracting portion 12h and the metal substrate 21 of the counter electrode 20 of the DSC 50A. In the present embodiment, the second connecting portion 12i is disposed in an L-shape between the annular coupling portion 14 and the main body portion 12a of the transparent conductive layer 12A of the DSC 50A. Moreover, the first current extracting portion 12f and the second current extracting portion 12h are disposed in the vicinity of the DSC 50A via the groove 90 so as to be adjacent to each other. Here, the groove 90 is constituted by a first groove 90A formed along the external shape of the annular sealing portion 30A and a second groove 90B which is formed along the edge portion of the part excluding the main body portion 12a of the transparent conductive layer 12 and intersects with the peripheral portion 80a of the back sheet 80. The first groove 90A is formed along the external shape of the annular sealing portion 30A, and thus the first groove 90A also includes a groove formed along the edge portion of the part excluding the main body portion 12a of the transparent conductive layer 12 in addition to the groove formed along the edge portion of the main body portion 12a of the transparent conductive layer 12. In addition, the first groove 90A refers to the groove formed on the inner side than the inner periphery of the annular coupling portion 14 in a case in which the DSC module 100 has the back sheet 80, and the second groove 90B refers to the groove formed on the outer side of the inner periphery of the annular coupling portion 14. Meanwhile, the transparent conductive layer 12F described above forms a cyclic structure together with the first current extracting portion 12f and the second current extracting portion 12h.

In addition, the connecting terminal 16 is provided on each of the protruding portions 12c of the transparent conductive layers 12A to 12C and the transparent conductive layer 12E. In the present embodiment, in the transparent conductive layers 12A to 12C, at least a conductive material connecting portion 16A of the connecting terminal 16 is provided on the facing portion 12e of the protruding portion 12c and faces the main body portion 12a of the adjacent DSC 50 to be connected. In the transparent conductive layer 12E, the conductive material connecting portion 16A of the connecting terminal 16 faces the main body portion 12a of the adjacent DSC 50A to be connected. Each connecting terminal 16 has the conductive material connecting portion 16A which is connected with the conductive material 60P and extends along the sealing portion 30A on the outer side of the sealing portion 30A and a conductive material non-connecting portion 16B which is not connected with the conductive material 60P and extends from the conductive material connecting portion 16A along the sealing portion 30A on the outer side of the sealing portion 30A. Moreover, the width of the conductive material non-connecting portion 16B is narrower than the width of the conductive material connecting portion 16A. Here, the width of the conductive material connecting portion 16A and the width of the conductive material non-connecting portion 16B are constant, respectively. Meanwhile, the width of the conductive material connecting portion 16A means the length in the direction orthogonal to the extending direction of the conductive material connecting portion 16A and the narrowest width of the width of the conductive material connecting portion 16A, and the width of the conductive material non-connecting portion 16B means the length in the direction orthogonal to the extending direction of the conductive material non-connecting portion 16B and the narrowest width of the width of the conductive material non-connecting portion 16B.

In addition, the conductive material connecting portion 16A of the connecting terminal 16 provided on the protruding portion 12c of the transparent conductive layer 12C of the DSC 50C is connected with the metal substrate 21 of the counter electrode 20 of the adjacent DSC 50D via the conductive material 60P. The conductive material 602 is disposed so as to pass over the sealing portion 30A. In the same manner, the conductive material connecting portion 16A of the connecting terminal 16 of the DSC 50B is connected with the metal substrate 21 of the counter electrode 20 of the adjacent DSC 50C via the conductive material 60P, and the conductive material connecting portion 16A of the connecting terminal 16 of the DSC 50A is connected with the metal substrate 21 of the counter electrode 20 of the adjacent DSC 50B via the conductive material 602. In addition, the conductive material connecting portion 16A of the connecting terminal 16 on the transparent conductive layer 12E is connected with the metal substrate 21 of the counter electrode 20 of the adjacent DSC 50A via the conductive material 602. In other words, the second connecting portion 12i of the transparent conductive layer 12E is connected with the metal substrate 21 of the counter electrode 20 in the adjacent DSC 50A via the connecting terminal 16 and the conductive material 60P.

In addition, external connecting terminals 18a and 18b are provided on the first current extracting portion 12f and the second current extracting portion 12h, respectively.

As illustrated in FIG. 1, the sealing portion 30A has an annular first sealing portion 31A provided between the transparent conductive substrate 15 and the counter electrode 20 and a second sealing portion 32A which is provided so as to be superimposed on the first sealing portion 31A and sandwiches an edge portion 20a of the counter electrode 20 together with the first sealing portion 31A. In addition, as illustrated in FIG. 4, the adjacent first sealing portions 31A are integrated so as to constitute a first integrated sealing portion 31. That is to say, the first integrated sealing portion 31 is constituted by an annular-shaped part 31a (hereinafter, referred to as the "annular portion") which is not provided between the two adjacent counter electrodes 20 and a part 31b (hereinafter, referred to as the "partitioning portion") which is provided between the two adjacent counter electrodes 20 and partitions an inner side opening 31c of the annular-shaped part 31a. In addition, as illustrated in FIG. 5, second sealing portions 32A are integrated between the adjacent counter electrodes 20 so as to constitute a second integrated sealing portion 32. The second integrated sealing portion 32 is constituted by an annular-shaped part 32a (hereinafter, referred to as the "annular portion") which is not provided between the two adjacent counter electrodes 20 and a part 32b (hereinafter, referred to as the "partitioning portion") which is provided between the two adjacent counter electrodes 20 and partitions an inner side opening 32c of the annular-shaped part 32a.

In addition, as illustrated in FIG. 1, between the first sealing portion 31A and the groove 90, an insulating material 33 composed of a glass frit is provided so as to enter into the groove 90 between the adjacent transparent conductive layers 12A to 12F and to spread over the adjacent transparent conductive layers 12. To describe in detail, the insulating material 33 also covers the edge portion of the main body portion 12 forming the first groove 90A as well as enters into the first groove 90A formed along the edge portion of the main body portion 12a of the transparent conductive layer 12 of the groove 90. However, in the present embodiment, the groove formed along the edge portion of the part excluding the main body portion 12a of the transparent conductive layer 12 of the first groove 90A is not covered with the insulating material 33.

As illustrated in FIG. 6, the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. Furthermore, the width R of the partitioning portion 31b of the first integrated sealing portion 31 is 100% or more and less than 200% of the width T of the annular portion 31a of the first integrated sealing portion 31.

In addition, the second integrated sealing portion 32 has a main body portion 32d provided on the side opposite to the working electrode 10 of the counter electrode 20 and an adhesive portion 32e provided between the adjacent counter electrodes 20. The second integrated sealing portion 32 is adhered to the first integrated sealing portion 31 by the adhesive portion 32e.

As illustrated in FIG. 1, the back sheet 80 is provided on the transparent conductive substrate 15. The back sheet 80 includes a laminate 80A including a weather-resistant layer and a metal layer and an adhesive portion 80B which is provided on the side opposite to the metal layer with respect to the laminate 80A and adheres to the transparent conductive substrate 15 via the coupling portion 14. Here, the adhesive portion 80B is provided in order to make the back sheet 80 adhere to the transparent conductive substrate 15, and as illustrated in FIG. 1, the adhesive portion 80B may be formed on the peripheral portion of the laminate 80A. However, the adhesive portion 80B may be provided on the entire surface of the DSC 50 side of the laminate 80A. The peripheral portion 80a of the back sheet 80 is connected with the transparent conductive layers 12D, 12E, and 12F among the transparent conductive layers 12 by the adhesive portion 80B via the coupling portion 14. Here, the adhesive portion 80B is spaced apart from the sealing portion 30A of the DSC 50. Moreover, the coupling portion 14 is also spaced apart from the sealing portion 30A. Furthermore, the second connecting portion 12i of the transparent conductive layer 12E is disposed on the inner side of the annular coupling portion 14. In addition, the transparent conductive layer 12F connects the transparent substrate 11 with the coupling portion 14 and is provided so as to surround the transparent conductive layers 12A to 12D of the DSC 50 and to form a part of the groove 90 (gap) between the transparent conductive layers 12A to 12D. Here, the first groove 90A which is a part of the groove 90 is disposed on the inner side of the inner periphery of the annular coupling portion 14, and the second groove 90B is disposed on the outer side of the inner periphery of the annular coupling portion 14. Meanwhile, the electrolyte 40 is not filled in the space which is on the inner side than the back sheet 80 and the outer side of the sealing portion 30A.

In addition, in the transparent conductive layer 12D, a first current collecting wiring 17 having a lower resistance than the transparent conductive layer 12D extends so as to pass through the main body portion 12a, the first connecting portion 12g, and the current extracting portion 12f. This first current collecting wiring 17 is disposed so as not to intersect with the coupling portion 14 of the back sheet 80 with the transparent conductive substrate 15. That is to say, the first current collecting wiring 17 is disposed on the inner side than the coupling portion 14.

Meanwhile, as illustrated in FIG. 2, bypass diodes 70A to 70D are connected in parallel with the DSCs 50A to 50D, respectively. Specifically, the bypass diode 70A is fixed on the partitioning portion 32b of the second integrated sealing portion 32 between the DSC 50A and the DSC 50B, the bypass diode 70B is fixed on the partitioning portion 32b of the second integrated sealing portion 32 between the DSC 50B and the DSC 50C, and the bypass diode 70C is fixed on the partitioning portion 32b of the second integrated sealing portion 32 between the DSC 50C and the DSC 50D. The bypass diode 70D is fixed on the sealing portion 30A of the DSC 50D. In addition, the conductive material 60Q is fixed to the metal substrate 21 of the counter electrode 20 so as to pass through the bypass diodes 70A to 70D. Moreover, the conductive material 60P branches out from the conductive materials 60Q between the bypass diodes 70A and 70B, between the bypass diodes 70B and 70C, and between the bypass diodes 70C and 70D, respectively, and is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60P is also fixed to the metal substrate 21 of the counter electrode 20 of the DSC 50A, and this conductive material 60P connects the bypass diode 70A with the conductive material connecting portion 16A of the connecting terminal 16 on the transparent conductive layer 12E. Moreover, the bypass diode 70D is connected with the transparent conductive layer 12D via the conductive material 60P.

In addition, as illustrated in FIG. 1, a desiccant 95 is provided on the counter electrode 20 of each DSC 50.

According to the DSC module 100 above, the groove 90 is formed along the edge portion of the transparent conductive layer 12, and this groove 90 has the first groove 90A formed along the edge portion of the main body portion 12a of the transparent conductive layer 12 disposed on the inner side of the annular sealing portion 30A. Moreover, the insulating material 33 composed of a glass frit enters into the first groove 90A, and also this insulating material 33 covers the edge portion of the main body portion 12a forming the first groove 90A as well. For this reason, even if a crack is formed inside the transparent substrate 11 and at the position downward the groove 90 along the groove 90 and the crack continues to the edge portion of the main body portion 12a, the penetration of moisture, which has passed through the crack, from the outside of the sealing portion 30A is sufficiently suppressed by the insulating material 33. Particularly, in the DSC module 100, the insulating material 33 which covers the edge portion of the main body portion 12a forming the first groove 90A and enters into the first groove 90A is composed of a glass frit, and thus higher sealing performance is exhibited compared to a case in which the insulating material 33 is a resin. For this reason, according to the DSC module 100, it is possible to exhibit excellent durability.

In addition, in the DSC module 100, the sealing portion 30A and the insulating material 33 are disposed so as to be superimposed on each other. For this reason, it is possible to further increase the area of the part contributing to the power generation when seen from the light receiving surface side of the DSC module 100 compared to a case in which the sealing portion 30A and the insulating material 33 are disposed so as not to be superimposed on each other. For this reason, it is possible to more improve the aperture ratio.

In addition, in the DSC module 100, the first current extracting portion 12f and the second current extracting portion 12h are disposed in the vicinity of the DSC 50A and on the side opposite to the transparent conductive layer 12B with respect to the transparent conductive layer 12A, and the first current extracting portion 12f of the transparent conductive layer 12A and the second current extracting portion 12h of the transparent conductive layer 12E are disposed so as to be adjacent to each other via the groove 90. For this reason, in the DSC module 100, it is possible to dispose the external connecting terminals 18a and 18b to the first current extracting portion 12f and the second current extracting portion 12h, respectively, so as to be adjacent to each other. Hence, it is possible to set the number of connectors for extracting the current from the external connecting terminals 18a and 18b to the outside to one. In other words, the first current extracting portion 12f and the second current extracting portion 12h are disposed to be greatly spaced apart from each other, for example, in a case in which the first current extracting portion 12f is disposed on the side opposite to the transparent conductive layer 12c with respect to the transparent conductive layer 12D, and thus the external connecting terminals 18a and 18b are disposed to be greatly spaced apart from each other as well. In this case, two connectors of a connector to be connected with the external connecting terminal 18a and a connector to be connected with the external connecting terminal 18b are required in order to extract the current from the DSC module 100. However, according to the DSC module 100, it is possible to dispose the external connecting terminals 18a and 18b so as to be adjacent to each other, and thus only one connector is required. For this reason, according to the DSC module 100, it is possible to achieve space saving. In addition, the generated current is low when the DSC module 100 is used under a low illuminance. Specifically, the generated current is 2 mA or lower. For this reason, it is possible to sufficiently suppress the deterioration of the photoelectric conversion performance of the DSC module 100 even if a part of the transparent conductive layer 12D of the DSC 50D on one end side of the DSC 50A and DSC 50D at both ends of the DSCs 50A to 50D is disposed next to the second current extracting portion 12h which is electrically connected with the metal substrate 21 of the counter electrode 20 of the DSC 50A on the other end side via the groove 90 as the first current extracting portion 12f.

In addition, in the DSC module 100, the DSCs 50A to 50D are arranged in a line along the X direction, the transparent conductive layer 12D of the DSC 50D on one end side of the DSC 50A and DSC 50D at both ends of the DSCs 50A to 50D has the main body portion 12a provided on the inner side of the sealing portion 30A, the first current extracting portion 12f, and the first connecting portion 12g which connects the main body portion 12a with the first current extracting portion 12f. For this reason, it is possible to more shorten the installation region of the connecting terminal 16 provided along the arrangement direction (X direction in FIG. 2) of the DSCs 50A to 50D in order to connect two adjacent DSCs 50 compared to a case in which the DSCs 50C and 50D of a part of the DSCs 50A to 50D are folded back in the middle and the DSC 50A and the DSC 50D are disposed so as to be adjacent to each other, and thus it is possible to achieve space saving to a greater extent. Furthermore, according to the DSC module 100, the generated current is usually low in a case in which the DSC module 100 is used in a low illuminance environment, and thus it is possible to sufficiently suppress the deterioration of the photoelectric conversion characteristics although the DSC module 100 further has the first connecting portion 12g which connects the main body portion 12a with the first current extracting portion 12f.

Moreover, in the DSC module 100, the first current collecting wiring 17 is disposed so as not to intersect with the coupling portion 14 of the transparent conductive substrate 15 with the back sheet 80. It is possible to prevent the water vapor or the like from penetrating from the outside into the space between the back sheet 80 and the transparent conductive substrate 15 through the first current collecting wiring 17 when the first current collecting wiring 17 is disposed so as not to intersect with the coupling portion 14 of the transparent conductive substrate 15 with the back sheet 80 although the current collecting wiring generally exhibits air permeability since it is porous and thus gas such as water vapor is permeable through it. As a result, it is possible for the DSC module 100 to exhibit excellent durability. Furthermore, it is possible to sufficiently suppress the deterioration of the photoelectric conversion characteristics even if the generated current increases since the first current collecting wiring 17 has a lower resistance than the transparent conductive layer 12D.

Furthermore, the connecting terminal 16 is less likely to peel off from the protruding portion 12c of the transparent conductive layer 12 as the width of the connecting terminal 16 is narrower in a case in which the DSC module 100 is placed in an environment in which the temperature change is great. With regard to that point, in the DSC module 100, the conductive material non-connecting portion 16B of the connecting terminal 16 has a narrower width than the conductive material connecting portion 16A connected with the conductive material 60P. For this reason, the conductive material non-connecting portion 16B of the connecting terminals 16 is less likely to peel off from the protruding portion 12c of the transparent conductive layer 12. Hence, the conductive material non-connecting portion 16B does not peel off from the transparent conductive layer 12 and thus it is possible to maintain the connection with the transparent conductive layer 12 even if the conductive material connecting portion 16A peels off from the protruding portion 12c of the transparent conductive layer 12. Furthermore, it is possible to normally operate the DSC module 100 even if the conductive material connecting portion 16A peels off from the protruding portion 12c of the transparent conductive layer 12. Consequently, according to the DSC module 100, it is possible to improve the connection reliability. In addition, the conductive material 60P connected with the metal substrate 21 of the counter electrode 20 of one DSC 50 of two adjacent DSCs 50 is connected with the conductive material connecting portion 16A on the protruding portion 12c of the other DSC 50, and the conductive material connecting portion 16A is provided on the protruding portion 12c and the outer side of the sealing portion 30A. In other words, the connection of two adjacent DSCs 50 is performed on the outer side of the sealing portion 30A. For this reason, according to the DSC module 100, it is possible to improve the aperture ratio.

In addition, in the DSC module 100, in the DSC 50 that is connected with the adjacent DSC 50 among the DSCs 50A to 50D, the protruding portion 12c has the projecting portion 12d which laterally projects from the main body portion 12a and the facing portion 12e which extends from the projecting portion 12d and faces the main body portion 12a of the adjacent DSC 50, and at least the conductive material connecting portion 16A of the connecting terminal 16 is provided on the facing portion 12e.

In this case, at least the conductive material connecting portion 16A of the connecting terminal 16 is provided on the facing portion 12e facing the main body portion 12a of the adjacent DSC 50, and thus it is possible to sufficiently prevent the conductive material 602 connected with the conductive material connecting portion 16A from passing over the metal substrate 21 of the counter electrode 20 of the adjacent DSC 50 unlike the case in which at least the conductive material connecting portion 16A of the connecting terminal 16 is not provided on the facing portion 12e facing the main body portion 12a of the adjacent DSC 50. As a result, it is possible to sufficiently prevent the short circuit between the adjacent DSCs 50.

In addition, in the DSC module 100, both of the conductive material connecting portion 16A and the conductive material non-connecting portion 16B are disposed along the sealing portion 30A. For this reason, it is possible to save the space required for the connecting terminal 16 compared to the case of disposing the conductive material connecting portion 16A and the conductive material non-connecting portion 16B in the direction away from the sealing portion 30A.

Furthermore, in the DSC module 100, the adhesive portion 80B of the back sheet 80 is spaced apart from the sealing portion 30A of the DSC 50. For this reason, it is sufficiently suppressed that the sealing portion 30A is stretched since the adhesive portion 80B is constricted at a low temperature and thus an excessive stress is applied to the interface between the sealing portion 30A and the transparent conductive substrate 15 or the counter electrode 20. In addition, at a high temperature as well, it is sufficiently suppressed that the sealing portion 30A is pressed since the adhesive portion 80B expands and thus an excessive stress is applied to the interface between the sealing portion 30A and the transparent conductive substrate 15 or the counter electrode 20. In other words, it is sufficiently suppressed that an excessive stress is applied to the interface between the sealing portion 30A and the transparent conductive substrate 15 or the counter electrode 20 both at a high temperature and a low temperature. For this reason, it is possible for the DSC module 100 to exhibit excellent durability.

Furthermore, in the DSC module 100, the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. For this reason, it is possible to more sufficiently improve the aperture ratio of the DSC module 100. In addition, in the DSC module 100, the adjacent first sealing portions 31A are integrated between the adjacent counter electrodes 20 and the adjacent second sealing portions 32A are integrated between the adjacent counter electrodes 20. Here, the sealing portion exposed to the atmosphere is in two places in between the adjacent DSCs 50 when the adjacent first sealing portions 31A are not integrated. In contrast to this, in the DSC module 100, the sealing portion exposed to the atmosphere is in one place in between the adjacent DSCs 50 since the adjacent first sealing portions 31A are integrated. In other words, the sealing portion exposed to the atmosphere is in only one place of the partitioning portion 31b in between the adjacent DSCs 50 since the first integrated sealing portion 31 is constituted by the annular portion 31a and the partitioning portion 31b. In addition, the penetration distance of moisture or the like from the atmosphere to the electrolyte 40 extends since the first sealing portions 31A are integrated. For this reason, it is possible to sufficiently reduce the amount of moisture or air penetrating from the outside of the DSC 50 in between the adjacent DSCs 50. In other words, it is possible to sufficiently improve the sealing ability of the DSC module 100. In addition, according to the DSC module 100, the adjacent first sealing portions 31A are integrated. For this reason, it is possible to secure a sufficient sealing width at the partitioning portion 31b even if the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. In other words, according to the DSC module 100, it is possible to sufficiently increase the bonding strength of the first sealing portion 31A with the transparent conductive substrate 15 and the bonding strength of the first sealing portion 31A with the counter electrode 20 while improving the aperture ratio. As a result, it is possible to improve the aperture ratio as well as it is possible to sufficiently suppress the peeling of the first sealing portion 31A from the transparent conductive substrate 15 and the counter electrode 20 even if the electrolyte 40 expands and thus an excessive stress directed from the inner side to the outer side of the first sealing portion 31A is applied in the case of using the DSC module 100 under a high temperature, and thus it is possible to exhibit excellent durability.

Furthermore, in the DSC module 100, the width R of the counter electrode 20 with the partitioning portion 31b of the first integrated sealing portion 31 is 100% or more and less than 200% of the width T of the annular portion 31a of the first integrated sealing portion 31. In this case, the width of the partitioning portion 31b is 100% or more of the width T of the annular portion 31a in the partitioning portion 31b of the first integrated sealing portion 31, and thus the penetration distance of moisture or the like from the atmosphere to the electrolyte 40 extends compared to a case in which the width R of the partitioning portion 31b is less than 100% of the width T of the annular portion 31a in the partitioning portion 31b of the first integrated sealing portion 31. For this reason, it is possible to more sufficiently suppress that the moisture penetrates from the outside through the partitioning portion 31b present between the adjacent DSCs 50. On the other hand, it is possible to more improve the aperture ratio compared to a case in which the width R of the partitioning portion 31b exceeds 200% of the width T of the annular portion 31a.

In addition, in the DSC module 100, the second sealing portion 32A is adhered to the first sealing portion 31A, and the edge portion 20a of the counter electrode 20 is sandwiched by the first sealing portion 31A and the second sealing portion 32A. For this reason, the peeling is sufficiently suppressed by the second sealing portion 32A even if the stress in the direction away from the working electrode 10 with respect to the counter electrode 20 is applied. In addition, the partitioning portion 32b of the second integrated sealing portion 32 is adhered to the first sealing portion 31A through the gap S between the adjacent counter electrodes 20 and thus it is reliably prevented that the counter electrodes 20 of the adjacent DSCs 50 come in contact with each other.

Next, the working electrode 10, the coupling portion 14, the photosensitizing dye, the counter electrode 20, the sealing portion 30A, the electrolyte 40, the conductive materials 60P and 60Q, the back sheet 80, and the desiccant 95 will be described in detail.

(Working Electrode)

The material constituting the transparent substrate 11 may be any transparent material, for example, and examples of such a transparent material may include glass such as borosilicate glass, soda lime glass, glass which is made of soda lime and whose iron component is less than that of ordinary soda lime glass, and quartz glass, polyethylene terephthalate (PET), polyethylene naphthalate (PEN), polycarbonate (PC), and polyethersulfone (PES). The thickness of the transparent substrate 11 is appropriately determined depending on the size of the DSC module 100 and is not particularly limited, but it may be set into the range of from 50 to 10000 μm, for example.

Examples of the material contained in the transparent conductive layer 12 may include a conductive metal oxide such as indium-tin-oxide (ITO), tin oxide ($SnO_2$), and fluorine-doped-tin-oxide (FTO). The transparent conductive layer 12 may be constituted by a single layer or a laminate consisting of a plurality of layers containing different conductive metal oxides. It is preferable that the transparent conductive layer 12 contain FTO since FTO exhibits high heat resistance and chemical resistance in a case in which the transparent conductive layer 12 is constituted by a single layer. The transparent conductive layer 12 may further contain a glass frit. The thickness of the transparent conductive layer 12 may be set into the range of from 0.01 to 2 μm, for example.

In addition, the resistance value of the first connecting portion 12g of the transparent conductive layer 12D of the transparent conductive layer 12 is not particularly limited but is preferably equal to or less than the resistance value represented by the following Equation (1).

$$\text{Resistance value} = \text{number of DSC 50 connected in series} \times 120\Omega \quad (1)$$

In this case, it is possible to sufficiently suppress the deterioration of the performance of the DSC module 100 compared to a case in which the resistance value of the first connecting portion 12g exceeds the resistance value represented by Equation (1) above. In the present embodiment, the number of DSCs 50 is 4 and thus the resistance value represented by Equation (1) above becomes 480Ω, and consequently, the resistance value of the first connecting portion 12g is preferably 480Ω or less.

The thickness of the insulating material 33 is usually from 10 to 30 μm and preferably from 15 to 25 μm.

The connecting terminal 16 contains a metallic material. Examples of the metallic material may include silver, copper and indium. These may be used singly or in combination of two or more kinds thereof.

In addition, the connecting terminal 16 may be constituted by the same material as or a different material from the conductive material 60P but it is preferable to be constituted by the same material.

In this case, it is possible to more sufficiently improve the adhesive property of the connecting terminal 16 with the conductive material 60P since the connecting terminal 16 and the conductive material 60$_2$ are constituted by the same material. For this reason, it is possible to more improve the connection reliability of the DSC module 100.

In the connecting terminal 16, the width of the conductive material non-connecting portion 16B is not particularly limited as long as it is narrower than the width of the conductive material connecting portion 16A, but it is preferable to be equal to or less than ½ of the width of the conductive material connecting portion 16A.

In this case, it is possible to more improve the connection reliability of the DSC module 100 compared to a case in which the width of the conductive material non-connecting portion 16B exceeds ½ of the width of the conductive material connecting portion 16A.

The width of the conductive material connecting portion 16A is not particularly limited but is preferably from 0.5 to 5 mm and more preferably from 0.8 to 2 mm.

The connecting terminal 16 provided on the second connecting portion 12i included in the transparent conductive layer 12E among the connecting terminals 16 may have a lower resistance than the transparent conductive layer 12E. In this case, the connecting terminal 16 provided on the second connecting portion 12i functions as a second current collecting wiring. In this case, it is possible to sufficiently suppress the deterioration of the photoelectric conversion characteristics even if the generated current increases since the second current collecting wiring has a lower resistance than the second connecting portion 12i. In addition, the connecting terminal 16 is disposed so as not to intersect with the peripheral portion 80a of the back sheet 80. In other words, the second current collecting wiring is disposed so as not to intersect with the peripheral portion 80a of the back sheet 80. In this case, it is possible to prevent the water vapor or the like from penetrating from the outside into the space on the inner side of the back sheet 80 through the second current collecting wiring when the second current collecting wiring is disposed so as not to intersect with the peripheral portion 80a of the back sheet 80 although the current collecting wiring generally exhibits air permeability since it is porous and thus gas such as water vapor is permeable through it. As a result, it is possible for the DSC module 100 to exhibit excellent durability.

The oxide semiconductor layer 13 is constituted by oxide semiconductor particles. The oxide semiconductor particles are constituted by, for example, titanium oxide ($TiO_2$), silicon oxide ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or two or more kinds of these.

The oxide semiconductor layer 13 is usually constituted by an absorbing layer for absorbing light, but may be constituted by an absorbing layer and a reflective layer to return the light that is transmitted through the absorbing layer to the absorbing layer by reflecting the light.

The thickness of the oxide semiconductor layer 13 may be set to from 0.5 to 50 μm, for example.

(Coupling Portion)

The material constituting the coupling portion 14 is not particularly limited as long as it can make the back sheet 80 adhere to the transparent conductive layer 12, and it is possible to use, for example, a glass frit, a resin material which is the same as the resin material used for the sealing portion 31A, or the like as the material constituting the coupling portion 14. Among them, the coupling portion 14 is preferably a glass frit. It is possible to effectively suppress the penetration of moisture or the like from the outside of the back sheet 80 since the glass frit exhibits higher sealing ability than the resin material.

(Photosensitizing Dye)

Examples of the photosensitizing dye may include a ruthenium complex having a ligand containing a bipyridine structure, terpyridine structure or the like, or an organic dye such as porphyrin, eosin, rhodamine, or merocyanine.

(Counter Electrode)

As described above, the counter electrode 20 is equipped with a metal substrate 21 and a conductive catalyst layer 22 which is provided on the working electrode 10 side of the metal substrate 21 and promotes the reduction reaction on the surface of the counter electrode 20.

The metal substrate 21 is constituted by, for example, a corrosion-resistant metallic material such as titanium, nickel, platinum, molybdenum, tungsten, aluminum, or stainless steel. The thickness of the metal substrate 21 is appropriately determined depending on the size of the DSC module 100 and is not particularly limited, but it may be set to from 0.005 to 0.1 mm, for example.

The catalyst layer 22 is constituted by platinum, a carbon-based material, or a conductive polymer. Here, a carbon nanotube is suitably used as the carbon-based material.

(Sealing Portion)

The sealing portion 30A is constituted by the first sealing portion 31A and the second sealing portion 32A.

Examples of the material constituting the first sealing portion 31A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer.

The thickness of the first sealing portion 31A is usually from 40 to 90 μm and preferably from 60 to 80 μm.

The width P of the adhesive portion of the counter electrode 20 with the partitioning portion 31b is 25% or more and less than 100% of the width Q of the adhesive portion of the counter electrode 20 with the annular portion 31a of the first integrated sealing portion 31. In this case, it is possible to exhibit more excellent durability compared to a case in which the width P of the adhesive portion is less than 25% of the width Q of the adhesive portion. The width P of the adhesive portion is more preferably 30% or more and even more preferably 40% or more of the width Q of the adhesive portion.

In the DSC module 100, the width R of the partitioning portion 31b of the first integrated sealing portion 31 is preferably 100% or more and less than 200% and more preferably from 120 to 180% of the width T of the annular portion 31a of the first integrated sealing portion 31.

In this case, it is possible to balance a great aperture ratio with excellent durability.

Examples of the material constituting the second sealing portion 32A may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer in the same manner as the first sealing portion 31A.

The thickness of the second sealing portion 32A is usually from 20 to 45 μm and preferably from 30 to 40 μm.

(Electrolyte)

The electrolyte 40 contains, for example, a redox couple such as $I^-/I_3^-$ and an organic solvent. It is possible to use acetonitrile, methoxy acetonitrile, methoxy propionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenyl acetonitrile, acrylonitrile, succinonitrile, oxalonitrile, pentanenitrile, and adiponitrile as the organic solvent. Examples of the redox couple may include a redox couple such as bromine/bromide ion, a zinc complex, an iron complex, and a cobalt complex in addition to $I^-/I_3^-$. In addition, the electrolyte 40 may use an ionic liquid instead of the organic solvent. As the ionic liquid, it is possible to use, for example, an ordinary temperature molten salt which is a known iodine salt, such as a pyridinium salt, an imidazolium salt, and a triazolium salt, and which is in a molten state at around room temperature. As such an ordinary temperature molten salt, it is possible to suitably use, for example, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, or methylpropylimidazolium iodide.

In addition, the electrolyte 40 may use a mixture of the ionic liquid above with the organic solvent above instead of the organic solvent above.

In addition, it is possible to add an additive to the electrolyte 40. Examples of the additive may include LiI, $I_2$, 4-t-butylpyridine, guanidinium thiocyanate, 1-methylbenzimidazole, and 1-butylbenzimidazole.

Moreover, as the electrolyte 40, a nanocomposite gel electrolyte which is a quasi-solid electrolyte obtained by kneading nanoparticles such as $SiO_2$, $TiO_2$, and carbon nanotubes with the electrolyte above into a gel-like form may be used, or an electrolyte gelled using an organic gelling agent such as polyvinylidene fluoride, a polyethylene oxide derivative, and an amino acid derivative may also be used.

Meanwhile, the electrolyte 40 contains a redox couple consisting of $I^-/I_3^-$, and the concentration of $I_3^-$ is preferably 0.006 mol/L or less, more preferably from 0 to $6\times10^{-6}$ mol/L, and even more preferably from 0 to $6\times10^{-8}$ mol/L. In this case, it is possible to more reduce the leakage current since the concentration of $I_3^-$ which carries electrons is low. For this reason, it is possible to more increase the open circuit voltage, and thus it is possible to more improve the photoelectric conversion characteristics.

(Conductive Material)

As the conductive materials 60P and 60Q, for example, a metal film is used. It is possible to use, for example, silver or copper as the metallic material constituting the metal film.

(Back Sheet)

As described above, the back sheet 80 includes the laminate 80A including a weather resistant layer and a metal layer and the adhesive portion 80B which is provided on the surface of the DSC 50 side of the laminate 80A and adheres the laminate 80A to the coupling portion 14.

The weather resistant layer may be constituted by, for example, polyethylene terephthalate or polybutylene terephthalate.

The thickness of the weather resistant layer may be from 50 to 300 μm, for example.

The metal layer may be constituted by, for example, a metallic material containing aluminum. The metallic material is usually constituted by aluminum simple substance but may be an alloy of aluminum with other metals. Examples of the other metals may include copper, manganese, zinc, magnesium, lead, and bismuth. Specifically, a 1000 series aluminum is desirable in which other metals are added to aluminum of 98% or higher purity in a trace quantity. This is because this 1000 series aluminum is inexpensive and excellent in workability compared to other aluminum alloys.

The thickness of the metal layer is not particularly limited but may be from 12 to 30 μm, for example.

The laminate 80A may further include a resin layer. Examples of the material constituting the resin layer may include a butyl rubber, a nitrile rubber, and a thermoplastic resin. These can be used singly or in combination of two or more kinds thereof. The resin layer may be formed on the entire surface on the side opposite to the weather resistant layer of the metal layer or may be formed only on the peripheral portion thereof.

Examples of the material constituting the adhesive portion 80B may include a butyl rubber, a nitrile rubber, and a thermoplastic resin. These can be used singly or in combination of two or more kinds thereof. The thickness of the adhesive portion 80B is not particularly limited but may be from 300 to 1000 μm, for example.

(Desiccant)

The desiccant 95 may be in a sheet shape or granular. The desiccant 95 may be one which absorbs moisture, for example, and examples of the desiccant 95 may include silica gel, alumina, and zeolite.

Figure 7:
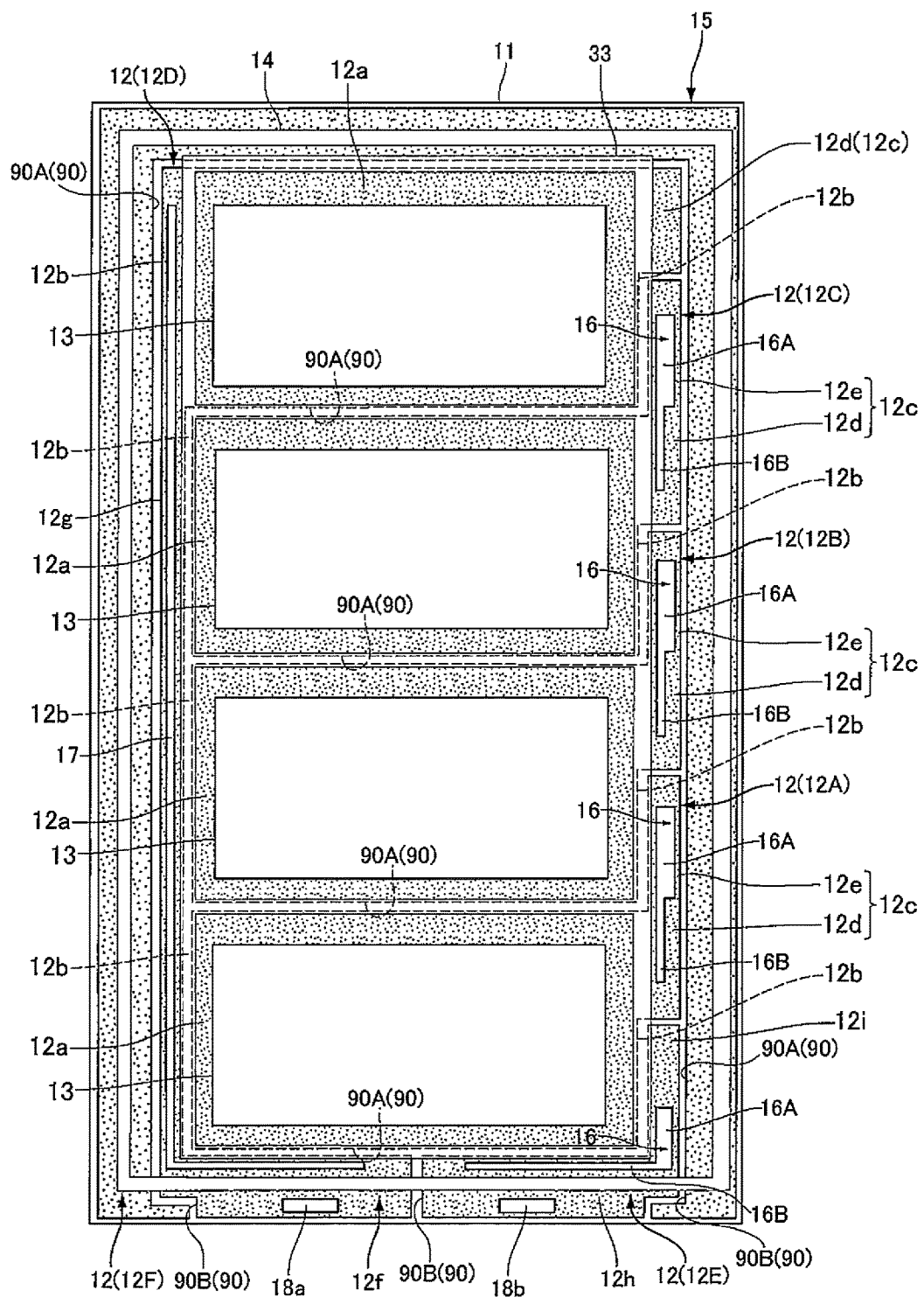
FIG. 7 is a plan view illustrating a working electrode having a coupling portion formed for fixing a back sheet.
Figure 8:
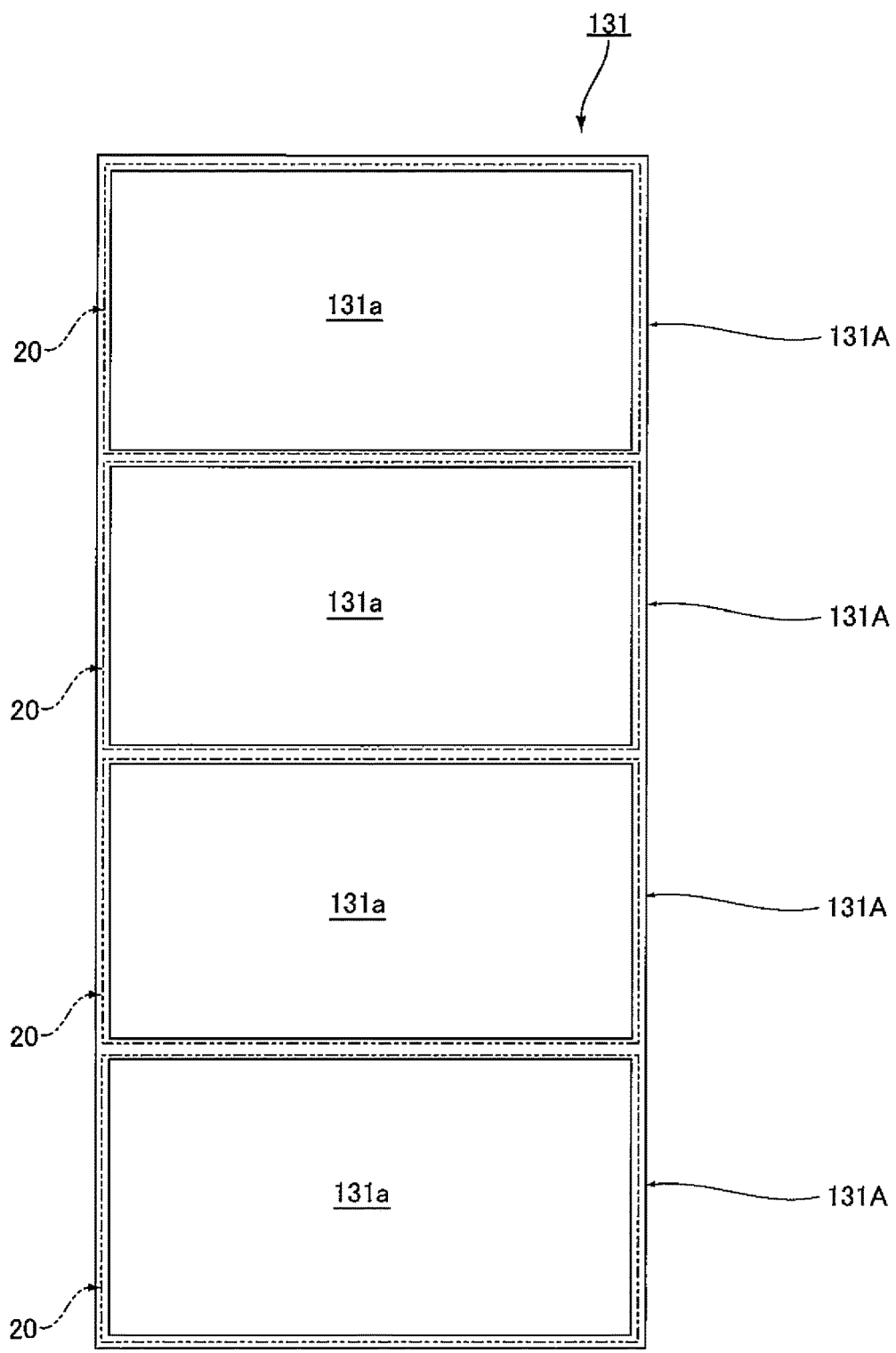
FIG. 8 is a plan view illustrating a first integrated sealing portion forming body for forming a first integrated sealing portion of FIG. 4.

Next, the method of manufacturing the DSC module 100 will be described with reference to FIG. 3, FIG. 7 and FIG. 8. FIG. 7 is a plan view illustrating a working electrode having a coupling portion formed for fixing a back sheet and FIG. 8 is a plan view illustrating a first integrated sealing portion forming body for forming a first integrated sealing portion of FIG. 4.

First, a laminate obtained by forming a transparent conductive layer on one transparent substrate 11 is prepared.

As the method of forming the transparent conductive layer, a sputtering method, a vapor deposition method, a spray pyrolysis deposition method (SPD), or a CVD method is used.

Next, as illustrated in FIG. 3, the groove 90 is formed with respect to the transparent conductive layer, and the transparent conductive layers 12A to 12F which are disposed in an insulated state to interpose the groove 90 between one another are formed. Specifically, the four transparent conductive layers 12A to 12D corresponding to the DSCs 50A to 50D are formed so as to have the quadrangular-shaped main body portion 12a and the protruding portion 12c. At this time, the transparent conductive layers 12A to 12C corresponding to the DSCs 50A to 50C are formed such that the protruding portion 12c has not only the projecting portion 12d but also the facing portion 12e which extends from the projecting portion 12d and faces the main body portion 12a of the adjacent DSC 50. In addition, the transparent conductive layer 12D is formed so as to have not only the quadrangular-shaped main body portion 12a and the projecting portion 12d but also the first current extracting portion 12f and the first connecting portion 12g connecting the first current extracting portion 12f and the main body portion 12a. At this time, the first current extracting portion 12f is formed so as to be disposed on the side opposite to the transparent conductive layer 12B with respect to the transparent conductive layer 12A. Moreover, the transparent conductive layer 12E is formed so as to form the second current extracting portion 12h and the second connecting portion 12i. At this time, the second current extracting portion 12h is formed so as to be disposed on the side opposite to the transparent conductive layer 12B with respect to the transparent conductive layer 12A and to be disposed next to the first current extracting portion 12f via the groove 90.

It is possible to form the groove 90 by, for example, a laser scribing method using a YAG laser, a $CO_2$ laser or the like as the light source.

In this manner, the transparent conductive substrate 15 obtained by forming a transparent conductive layer 12 on the transparent substrate 11 is obtained.

Next, a precursor of the connecting terminal 16 constituted by the conductive material connecting portion 16A and the conductive material non-connecting portion 16B is formed on the protruding portion 12c of the transparent conductive layers 12A to 12C. Specifically, the precursor of the connecting terminal 16 is formed such that the conductive material connecting portion 16A is provided on the facing portion 12e. In addition, the precursor of the connecting terminal 16 is also formed on the transparent conductive layer 12E. In addition, the precursor of conductive material non-connecting portion 16B is formed so as to be narrower than the width of the conductive material connecting portion 16A. The precursor of the connecting terminal 16 can be formed, for example, by coating and drying a silver paste.

Moreover, a precursor of the first current collecting wiring 17 is formed on the first connecting portion 12g of the transparent conductive layer 12D. The precursor of the first current collecting wiring 17 can be formed, for example, by coating and drying a silver paste.

In addition, precursors of the external connecting terminals 18a and 18b for extracting the current to the outside are respectively formed on the first current extracting portion 12f and the second current extracting portion 12h of the transparent conductive layer 12A. The precursor of the external connecting terminal can be formed, for example, by coating and drying a silver paste.

Furthermore, a precursor of the insulating material 33 composed of a glass frit is formed so as to enter into the first groove 90A formed along the edge portion of the main body portion 12a among the first grooves 90A and to cover the edge portion of the main body portion 12a as well. The insulating material 33 can be formed, for example, by coating and drying a paste containing a glass frit.

In addition, in order to fix the back sheet 80, in the same manner as the insulating material 33, a precursor of the annular coupling portion 14 is formed so as to surround the insulating material 33 and to pass through the transparent conductive layer 12D, the transparent conductive layer 12E, and the transparent conductive layer 12F.

Furthermore, a precursor of the oxide semiconductor layer 13 is formed on the main body portion 12a of each of the transparent conductive layers 12A to 12D. The precursor of the oxide semiconductor layer 13 can be formed by printing and then drying a paste for porous oxide semiconductor layer formation containing oxide semiconductor particles.

The paste for oxide semiconductor layer formation contains a resin such as polyethylene glycol and a solvent such as terpineol in addition to the oxide semiconductor particles.

It is possible to use, for example, a screen printing method, a doctor blading method, or a bar coating method as the printing method of the paste for oxide semiconductor layer formation.

Thereafter, the precursor of the connecting terminal 16, the precursor of the insulating material 33, the precursor of the coupling portion 14, and the precursor of the oxide semiconductor layer 13 are collectively fired to form the connecting terminal 16, the insulating material 33, the coupling portion 14, and the oxide semiconductor layer 13.

At this time, the firing temperature varies depending on the kind of the oxide semiconductor particles or the glass frit but is usually from 350 to 600° C., and the firing time also varies depending on the kind of the oxide semiconductor particles or the glass frit but is usually from 1 to 5 hours.

In this manner, as illustrated in FIG. 7, the working electrode 10 is obtained in which the coupling portion 14 for fixing the back sheet 80 is formed.

Next, the photosensitizing dye is supported on the oxide semiconductor layer 13 of the working electrode 10. For this, the photosensitizing dye may be adsorbed on the oxide semiconductor layer 13 by immersing the working electrode 10 in a solution containing the photosensitizing dye, the extra photosensitizing dye is then washed out with the solvent component of the above solution, and drying is performed, thereby the photosensitizing dye may be adsorbed on the oxide semiconductor layer 13. However, it is also possible to support the photosensitizing dye on the oxide semiconductor layer 13 by coating a solution containing the photosensitizer dye on the oxide semiconductor layer 13 and then drying to adsorb the photosensitizing dye on the oxide semiconductor layer 13.

Next, the electrolyte 40 is disposed on the oxide semiconductor layer 13.

Next, as illustrated in FIG. 8, a first integrated sealing portion forming body 131 for forming the first integrated sealing portion 31 is prepared. The first integrated sealing portion forming body 131 can be obtained by preparing one sheet of resin film for sealing composed of the material constituting the first integrated sealing portion 31 and forming a quadrangular-shaped opening 131a in the resin film for sealing as many as the number of the DSCs 50. The first integrated sealing portion forming body 131 has a structure formed by integrating a plurality of first sealing portion forming bodies 131A.

Thereafter, this first integrated sealing portion forming body 131 is adhered on the working electrode 10. At this time, the first integrated sealing portion forming body 131 is adhered to the working electrode 10 so as to be superimposed on the insulating material 33. The adhesion of the first integrated sealing portion forming body 131 to the working electrode 10 can be performed by heating the first integrated sealing portion forming body 131 to melt. In addition, the first integrated sealing portion forming body 131 is adhered to the working electrode 10 such that the main body portion 12a of the transparent conductive layer 12 is disposed on the inner side of the first integrated sealing portion forming body 131.

Meanwhile, the counter electrodes 20 are prepared to have the same number as the number of the DSCs 50.

The counter electrode 20 can be obtained by forming the conductive catalyst layer 22 which promotes the reduction reaction on the surface of the counter electrode 20 on the metal substrate 21.

Next, one more piece of the first integrated sealing portion forming body 131 described above is prepared. Thereafter, each of the plural counter electrodes 20 is bonded so as to close each of the openings 131a of the first integrated sealing portion forming body 131.

Next, the first integrated sealing portion forming body 131 adhered to the counter electrode 20 and the first integrated sealing portion forming body 131 adhered to the working electrode 10 are superimposed and melted by heating while applying a pressure to the first integrated sealing portion forming body 131. In this manner, the first integrated sealing portion 31 is formed between the working electrode 10 and the counter electrode 20. At this time, the first integrated sealing portion 31 is formed such that the width P of the adhesive portion of the surface on the transparent conductive substrate 15 side of the counter electrode 20 with the partitioning portion 31b of the first integrated sealing portion 31 is narrower than the width Q of the adhesive portion of the surface on the transparent conductive substrate 15 side of the counter electrode 20 with the annular portion 31a of the first integrated sealing portion 31. In addition, the first integrated sealing portion 31 is formed such that the width R of the partitioning portion 31b of the first integrated sealing portion 31 is 100% or more and less than 200% of the width T of the annular portion 31a of the first integrated sealing portion 31. The formation of the first integrated sealing portion 31 may be performed under the atmospheric pressure or reduced pressure, but it is preferable to be performed under reduced pressure.

Next, the second integrated sealing portion 32 is prepared (see FIG. 5). The second integrated sealing portion 32 has a structure formed by integrating a plurality of the first sealing portions 32A. The second integrated sealing portion 32 can be obtained by preparing one sheet of resin film for sealing and forming a quadrangular-shaped opening 32c in the resin film for sealing as many as the number of the DSCs 50. The second integrated sealing portion 32 is bonded to the counter electrode 20 so as to sandwich the edge portion 20a of the counter electrode 20 together with the first integrated sealing portion 31. The adhesion of the second integrated sealing portion 32 to the counter electrode 20 can be performed by heating the second integrated sealing portion 32 to melt.

Examples of the resin film for sealing may include a resin such as a modified polyolefin resin including an ionomer, an ethylene-vinyl acetic anhydride copolymer, an ethylene-methacrylic acid copolymer, an ethylene-vinyl alcohol copolymer and the like, an ultraviolet-cured resin, and vinyl alcohol polymer. It is preferable that the constituent material of the resin film for sealing to form the second integrated sealing portion 32 have a higher melting point than the constituent material of the resin film for sealing to form the first integrated sealing portion 31. In this case, the second sealing portion 32A is harder than the first sealing portion 31A, and thus it is possible to effectively prevent the contact between the counter electrodes 20 of the adjacent DSCs 50. In addition, the first sealing portion 31A is softer than the second sealing portion 32A, and thus it is possible to effectively alleviate the stress applied to the sealing portion 30A.

Next, the bypass diodes 70A, 70B, and 70C are fixed to the partitioning portion 32b of the second sealing portion 32. In addition, the bypass diode 70D is fixed on the sealing portion 30A of the DSC 50D as well.

Thereafter, the conductive material 60Q is fixed to the metal substrate 21 of the counter electrode 20 of the DSCs 50B and 50C so as to pass through the bypass diodes 70A to 70D. Moreover, the conductive material 60₂ is formed such that each of the conductive materials 60Q between the bypass diodes 70A and 70B, between the bypass diodes 70B and 70C, and between the bypass diodes 70C and 70D is connected with the conductive material connecting portion 16A on the transparent conductive layer 12A, the conductive material connecting portion 16A on the transparent conductive layer 12B, and the conductive material connecting portion 16A on the transparent conductive layer 12C, respectively. In addition, the conductive material 60₂ is fixed to the metal substrate 21 of the counter electrode 20 of the DSC 50A so as to connect the conductive material connecting portion 16A on the second connecting portion 12i of the transparent conductive layer 12E and the bypass diode 70A. Moreover, the transparent conductive layer 12D is connected with the bypass diode 70A by the conductive material 60₂.

At this time, with regard to the conductive material 60P, a paste containing a metallic material constituting the conductive material 60₂ is prepared, and this paste is coated from the counter electrode 20 over the conductive material connecting portion 16A of the connecting terminal 16 of the adjacent DSC 50 and cured. With regard to the conductive material 60Q, a paste containing a metallic material constituting the conductive material 60Q is prepared, and this paste is coated on each of the counter electrodes 20 so as to link the adjacent bypass diodes and cured. At this time, as the paste above, it is preferable to use a low-temperature curing type paste which is capable of being cured at a temperature of 90° C. or less from the viewpoint of avoiding an adverse effect on the photosensitizing dye.

Finally, the back sheet 80 is prepared, and the peripheral portion 80a of the back sheet 80 is adhered to the coupling portion 14. At this time, the back sheet 80 is disposed such that the adhesive portion 80B of the back sheet 80 is spaced apart from the sealing portion 30A of the DSC 50.

The DSC module 100 is obtained in the manner described above.

Meanwhile, in the description above, a method to collectively fire the precursor of the connecting terminal 16, the precursor of the insulating material 33, the precursor of the coupling portion 14, and the precursor of the oxide semiconductor layer 13 is used in order to form the connecting terminal 16, the insulating material 33, the coupling portion 14, and the oxide semiconductor layer 13, but the connecting terminal 16, the insulating material 33, the coupling portion 14, and the oxide semiconductor layer 13 may be formed by separately firing each of the precursors.

Figure 9:
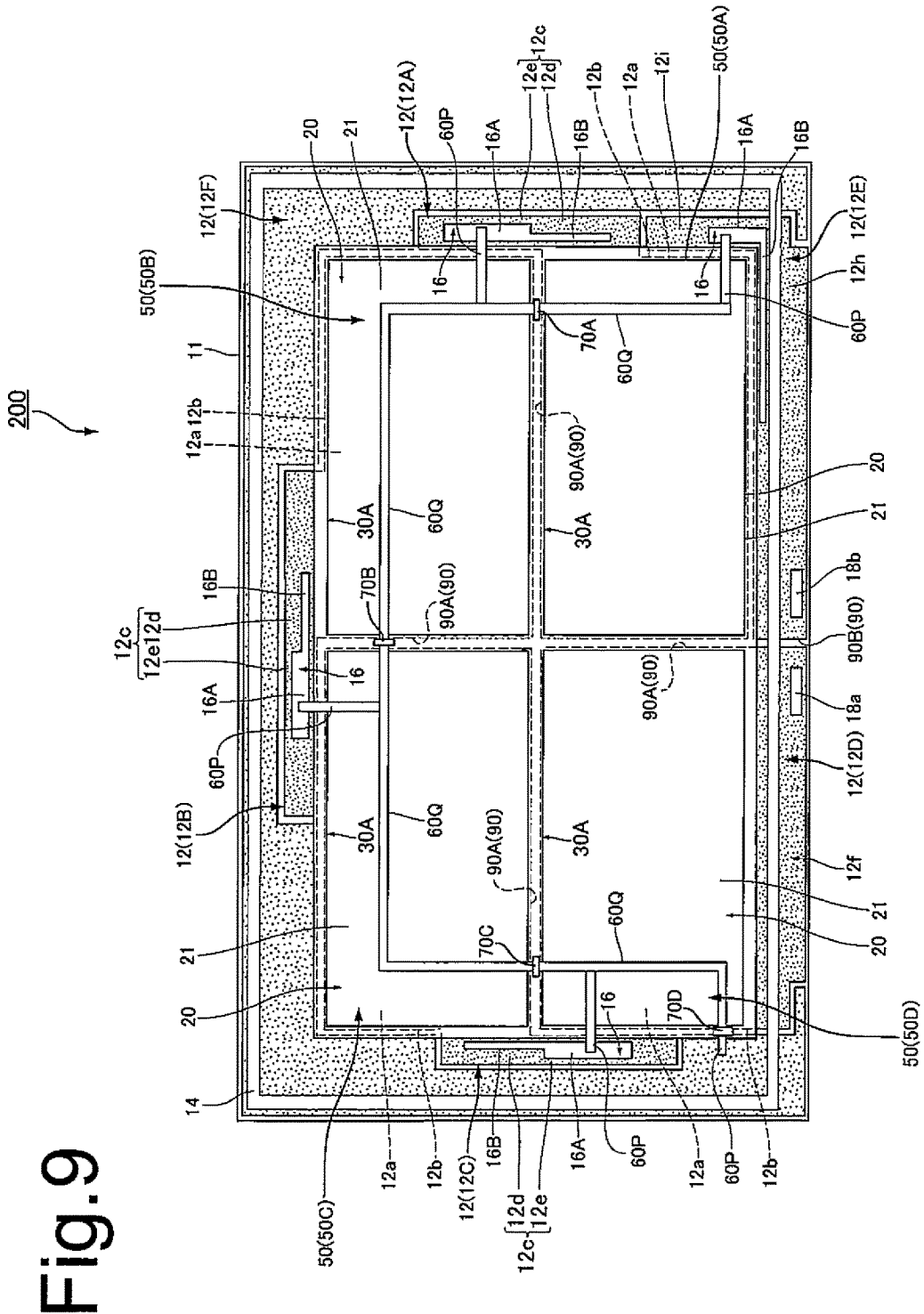
FIG. 9 is a plan view illustrating a part of a second embodiment of a dye-sensitized solar cell element of the invention.

The invention is not limited to the embodiment described above. For example, in the above embodiment, the DSCs 50A to 50D are arranged in a line along the X direction in FIG. 2, but the DSCs 50C and 50D which are a part of the DSCs 50A to 50D are folded back in the middle and the DSC 50A and the DSC 50D are disposed so as to be adjacent to each other as a DSC module 200 illustrated in FIG. 9. Meanwhile, in FIG. 9, the back sheet 80 is omitted. In this case, unlike the DSC module 100, it is not necessary to provide a first connecting portion 12g between the main body portion 12a and the first current extracting portion 12f in the transparent conductive layer 12D. For this reason, it is also not necessary to provide the first current collecting wiring 17.

Figure 10:
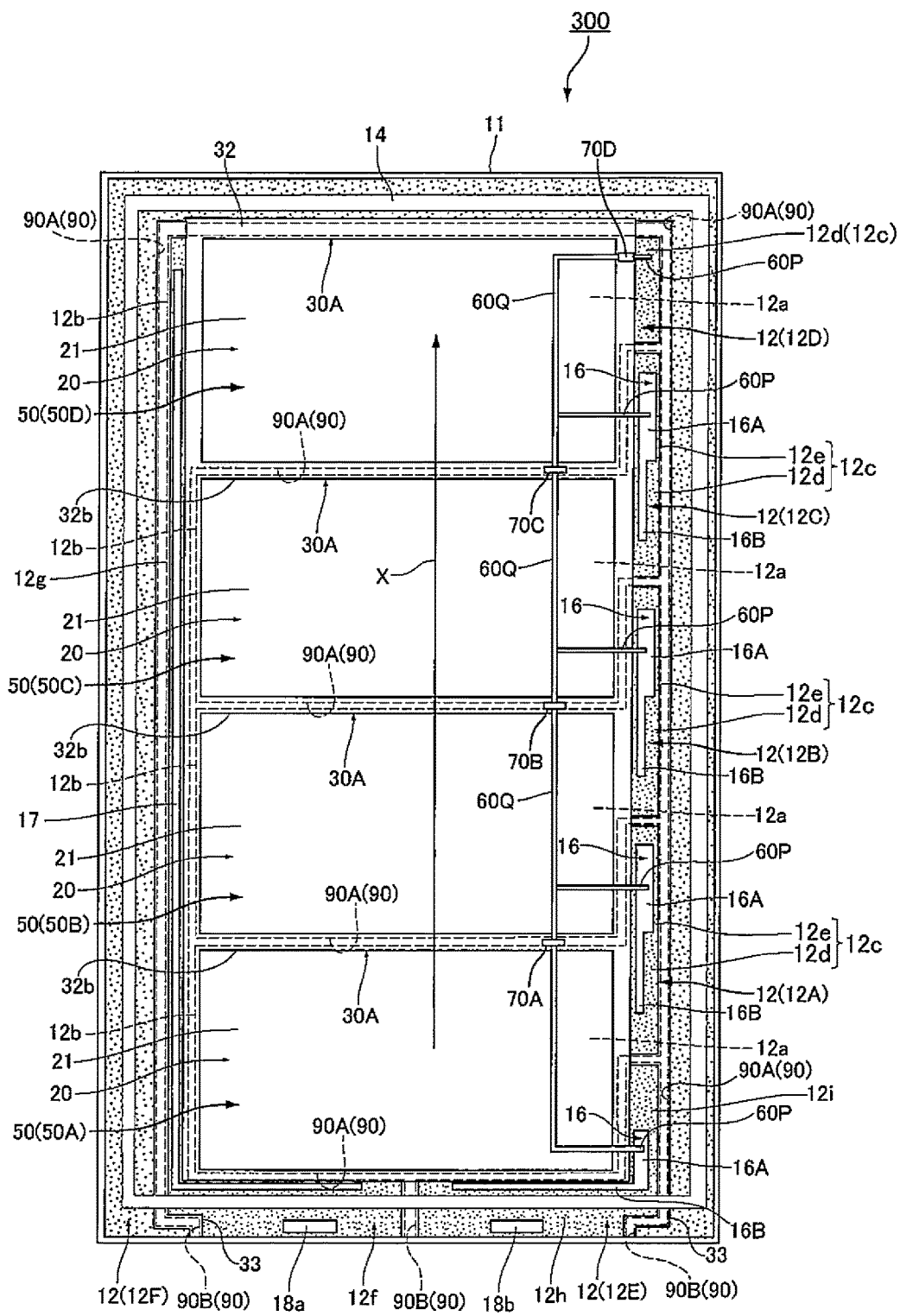
FIG. 10 is a plan view illustrating a part of a third embodiment of a dye-sensitized solar cell element of the invention.

In addition, in the above embodiment, the groove formed along the edge portion of the part excluding the main body portion 12a of the transparent conductive layer 12 of the first groove 90A and the second groove 90B which intersects with the adhesive portion 14 of the back sheet 80 with the transparent conductive substrate 15 are not covered with the insulating material 33 composed of a glass frit, but it is preferable that at least the second groove 90B be covered with the insulating material 33 composed of a glass frit as a DSC module 300 illustrated in FIG. 10. Meanwhile, in FIG. 10, the back sheet 80 is omitted. As illustrated in FIG. 10, it is possible for the moisture to penetrate into the space between the back sheet 80 and the transparent conductive substrate 15 through the second groove 90B when at least the second groove 90B intersects with the adhesive portion 14. In this case, the penetration of moisture from the outer side of the back sheet 80 into the inner side thereof is sufficiently suppressed when the insulating material 33 enters into at least the second groove 90B and covers the edge portion of the transparent conductive layer 12 which forms the second groove 90B. For this reason, it is sufficiently suppressed that the moisture which has penetrated into the space between the back sheet 80 and the transparent conductive substrate 15 enters into the electrolyte 40 through the sealing portion 30A. For this reason, it is possible to sufficiently suppress the deterioration of the durability of the DSC module 300.

Figure 11:
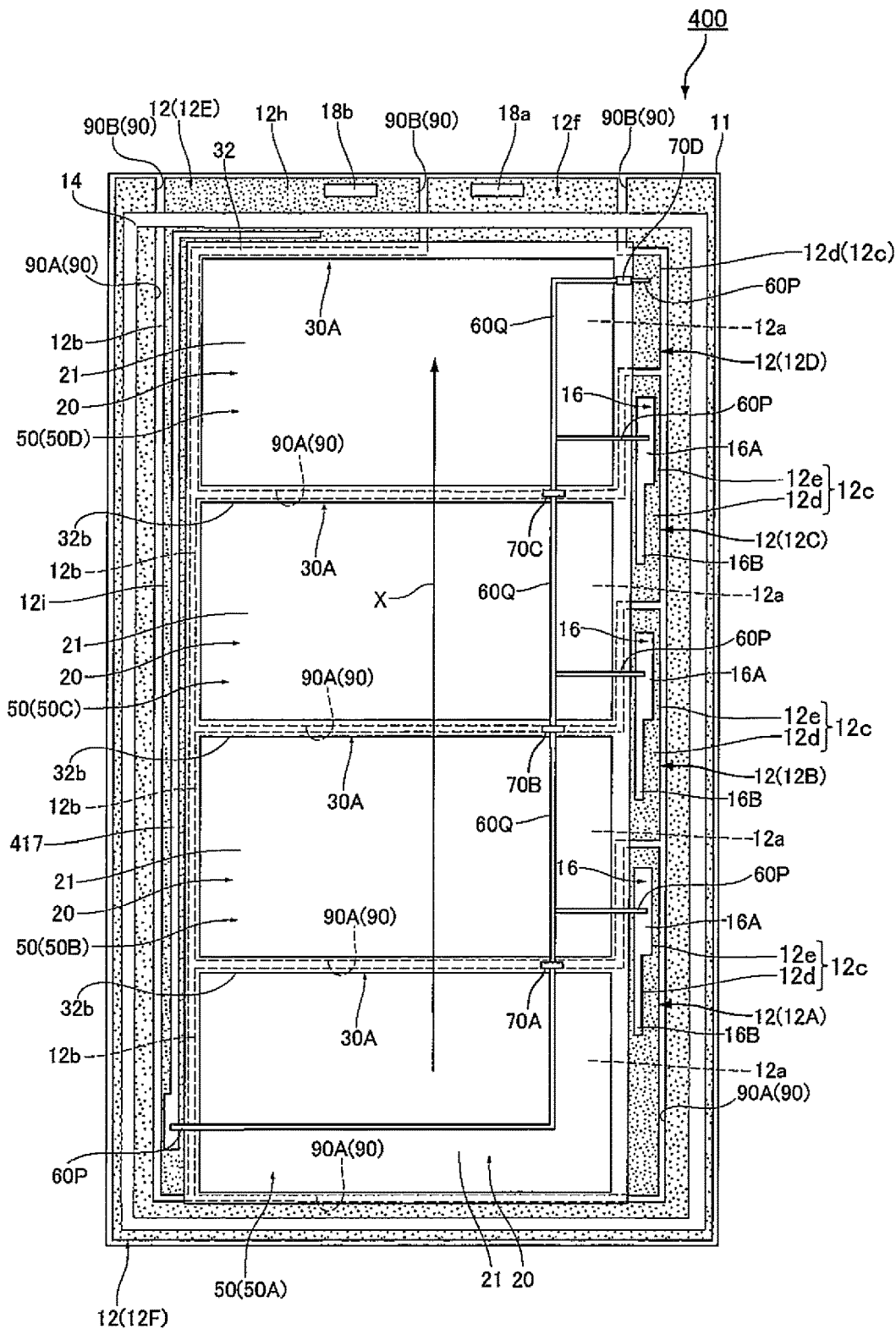
FIG. 11 is a plan view illustrating a part of a fourth embodiment of a dye-sensitized solar cell element of the invention.

Furthermore, in the above embodiment, the first current extracting portion 12f and the second current extracting portion 12h are disposed in the vicinity on the DSC 50A side, but from the viewpoint of achieving the above second object, the first current extracting portion 12f and the second current extracting portion 12h may be disposed in the vicinity on the DSC 50D side as illustrated in a DSC module 400 illustrated in FIG. 11. In this case, the first current extracting portion 12f is provided so as to protrude on the side opposite to the DSC 50C with respect to the main body portion 12a of the transparent conductive layer 12D to the outer side of the sealing portion 30A. On the other hand, the second current extracting portion 12h is provided on the side opposite to the DSC 50C with respect to the main body portion 12a of the transparent conductive layer 12D. In addition, the second connecting portion 12i extends along the transparent conductive layers 12A to 12D, and this second connecting portion 12i connects the second current extracting portion 12h with the metal substrate 21 of the counter electrode 20 of the DSC 50A. Specifically, a second current collecting wiring 417 is provided on the second connecting portion 12i along the second connecting portion 12i, and this second current collecting wiring 417 is connected with the conductive material 60P extending from the bypass diode 70A. It is possible to achieve space saving while exhibiting excellent photoelectric conversion characteristics by this DSC module 400 as well. Meanwhile, in this case, it is the same as the above embodiment that it is preferable that the resistance value of the second connecting portion 12i be equal to or less than the resistance value represented by the following Equation (1).

$$\text{Resistance value} = \text{number of DSC 50 connected in series} \times 120\Omega \tag{1}$$

In addition, in the above embodiment, the widths of the conductive material connecting portion 16A and the conductive material connecting portion 16B of the connecting terminal 16 are set to be constant, but each of the widths of the conductive material connecting portion 16A and the conductive material connecting portion 16B may change along the extending direction of the connecting terminal 16. For example, the width may monotonically increase from the end portion on the farthest side from the conductive material connecting portion 16A of the conductive material non-connecting portion 16B toward the end portion on the closest side thereof, and the width may monotonically increase from the end portion of the conductive material non-connecting portion 16B side of the conductive material connecting portion 16A toward the end portion on the farthest side from the conductive member non-connecting portion 16B. However, the conductive material non-connecting portion 16B is less likely to peel off when each of the widths of the conductive material non-connecting portion 16B and the conductive material connecting portion 16A is constant since the width of the connecting terminal 16 rapidly changes at the boundary between the conductive material non-connecting portion 16B and the conductive material connecting portion 16A.

In addition, in the above embodiment, the conductive material connecting portion 16A and the conductive material connecting portion 16B are provided along the sealing portion 30A, respectively, but these may be formed so as to extend in the direction away from the sealing portion 30A. However, in this case, it is preferable that the conductive material connecting portion 16A be disposed at the position closer to the sealing portion 30A than the conductive material non-connecting portion 16B. In this case, it is possible to more shorten the conductive material 60P.

Alternatively, in the connecting terminal 16 formed on the transparent conductive layers 12A to 12C, the conductive material non-connecting portion 16B may be disposed so as to be orthogonal to the conductive material connecting portion 16A.

In addition, in the above embodiment, the second sealing portion 32A is adhered to the first sealing portion 31A, but the second sealing portion 32A may not be adhered to the first sealing portion 31A.

Furthermore, in the above embodiment, the sealing portion 30A is constituted by the first sealing portion 31A and the second sealing portion 32A, but the second sealing portion 32A may be omitted.

In addition, in the above embodiment, the width P of the adhesive portion of the counter electrode 20 with the partitioning portion 31b of the first integrated sealing portion 31 is narrower than the width Q of the adhesive portion of the counter electrode 20 with the annular portion 31a of the first integrated sealing portion 31, but the width P of the adhesive portion may be equal to or more than the width Q of the adhesive portion from the viewpoint of achieving the above first object.

Furthermore, in the above embodiment, the width R of the partitioning portion 31b of the first integrated sealing portion 31 is 100% or more and less than 200% of the width T of the annular portion 31a of the first integrated sealing portion 31, but the width R of the partitioning portion 31b may be less than 100% or 200% or more of the width T of the annular portion 31a of the first integrated sealing portion 31.

Moreover, in the above embodiment, the annular first sealing portions 31A of the adjacent DSCs 50 are integrated, but the annular first sealing portions 31A of the adjacent DSCs 50 may not be necessarily integrated. In other words, the annular first sealing portions 31A may be spaced apart from each other.

Furthermore, in the above embodiment, the back sheet 80 is provided, but the back sheet 80 may not be necessarily provided. In this case, the coupling portion 14 is also not provided.

In addition, in the above embodiment, the back sheet 80 is adhered to the transparent conductive layer 12 via the coupling portion 14, but the back sheet 80 is not required to be necessarily adhered to the transparent conductive layer 12 via the coupling portion 14.

Moreover, in the above embodiment, the groove formed along the edge portion of the part excluding the main body portion 12a of the transparent conductive layer 12 of the first groove 90A and the second groove 90B are used as the gap between the separating portion and the transparent conductive layers 12A to 12D, but the gap is not required to be necessarily constituted by the groove.

In addition, in the above embodiment, the groove 90 has the second groove 90B, but the second groove 90B may not be necessarily formed. That is to say, the entire gaps between the transparent conductive layer 12F as the separating portion and the transparent conductive layers 12A to 12D may be disposed on the inner side of the inner periphery of the coupling portion 14.

Furthermore, in the above embodiment, the transparent conductive layer 12F is used as the separating portion surrounding the transparent conductive layers 12A to 12D, but the separating portion is not required to be constituted by a conductive body as the transparent conductive layer 12F and may be constituted by an insulating body.

Moreover, in the above embodiment, the separating portion such as the transparent conductive layer 12F is not necessarily required and it is possible to be omitted.

Furthermore, in the above embodiment, the coupling portion 14 and the sealing portion 30A are spaced apart from each other, but these may be adhered to each other.

Moreover, in the above embodiment, the transparent conductive substrate 15 has the transparent substrate 11 and the transparent conductive layer 12 and the counter electrode 20 has the metal substrate 21, but the counter electrode 20 may have the transparent substrate 11 and the transparent conductive layer 12 instead of the metal substrate 21 and the transparent conductive substrate 15 may be constituted by the metal substrate 21 from the viewpoint of achieving the second object. Alternatively, the counter electrode 20 may have the transparent substrate 11 and the transparent conductive layer 12 instead of the metal substrate 21 and the transparent conductive substrate 15 may have the transparent substrate 11 and the transparent conductive layer 12.

Furthermore, in the above embodiment, the coupling portion 14 is spaced apart from the insulating material 33, but it is preferable that both of these be constituted by a glass frit and integrated. In this case, the interface between the coupling portion 14 and the transparent conductive substrate 15 and the interface between the sealing portion 30A and the transparent conductive substrate 15 are not present even if moisture penetrates into the space between the back sheet 80 and the transparent conductive substrate 15. In addition, both of the insulating material 33 and the coupling portion 14 are composed of a glass frit and thus have a higher sealing ability compared to a resin. For this reason, it is possible to sufficiently suppress the penetration of moisture through the interface between the coupling portion 14 and the transparent conductive substrate 15 and the interface between the insulating material 33 and the transparent conductive substrate 15.

In addition, in the above embodiment, the insulating material 33 is composed of a glass frit, but the material constituting the insulating material 33 may be one having a higher melting point than the material constituting the first sealing portion 30A. For this reason, examples of such a material may include a thermosetting resin such as a polyimide resin and a thermoplastic resin in addition to a glass frit. Among them, it is preferable to use a thermosetting resin. In this case, even if the sealing portion 30A exhibits fluidity at a high temperature, the insulating material 33 is less likely to be fluidized even at a high temperature compared to the case of being composed of a thermoplastic resin in the same manner as the case of being composed of a glass frit. For this reason, the contact of the transparent conductive substrate 15 with the counter electrode 20 can be sufficiently suppressed, and thus the short circuit between the transparent conductive substrate 15 and the counter electrode 20 can be sufficiently suppressed.

In addition, in the above embodiment, the transparent conductive substrate 15 has the insulating material 33 but may not have the insulating material 33.

Moreover, in the above embodiment, the plurality of DSCs 50 are connected in series but may be connected in parallel.

Figure 12:
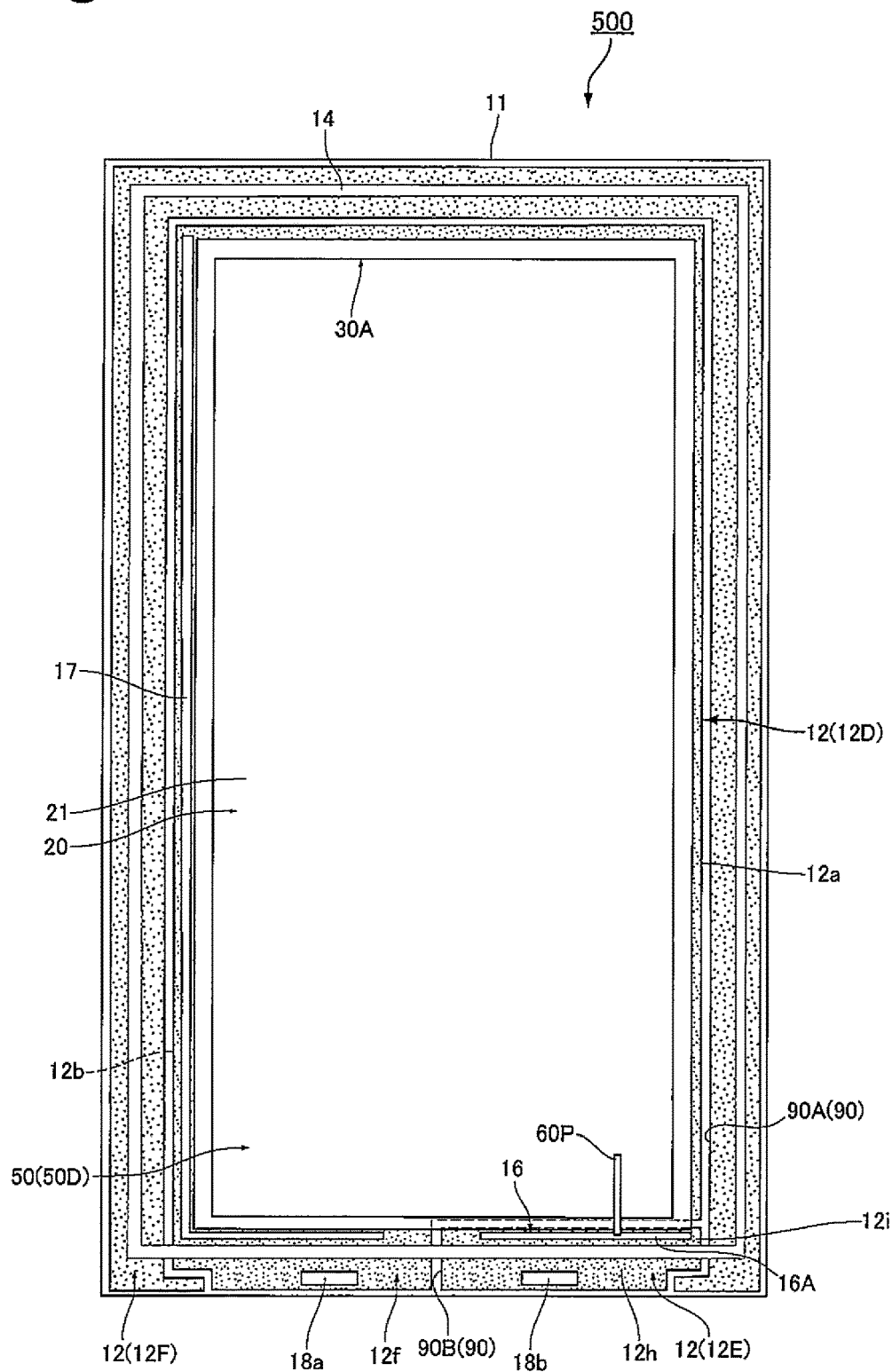
FIG. 12 is a plan view illustrating a part of a fifth embodiment of a dye-sensitized solar cell element of the invention.

Furthermore, in the above embodiment, the plurality of DSCs 50 are used but only one DSC 50 may be used as a dye-sensitized solar cell element 500 illustrated in FIG. 12 from the viewpoint of accomplishing the first object described above. Meanwhile, in the dye-sensitized solar cell element 500 illustrated in FIG. 12, the DSC 50A to DSC 50C are omitted, and the connecting terminal 16 provided on the second connecting portion 12i is electrically connected with the metal substrate 21 of the counter electrode 20 of the DSC 50D via the conductive material 60P. In addition, in the dye-sensitized solar cell element 500, the connecting terminal 16 is constituted by only the conductive material connecting portion 16A, and this conductive material connecting portion 16A is disposed between the sealing portion 30A and the coupling portion 14. In other words, the conductive material connecting portion 16A is not disposed at the position facing the side edge portion 12b of the main body portion 12a of the transparent conductive layer 12D of the DSC 50D. For this reason, it is possible to increase the oxide semiconductor layer 13 in size to the space at the part at which the conductive material connecting portion 16A is disposed in the DSC module 100 of the first embodiment. In this case, it is possible to increase the area for power generation in size as well as to effectively utilize the wasted space.

EXAMPLES

Hereinafter, the content of the invention will be described more specifically with reference to Examples, but the invention is not limited to the following Examples.

Example 1

First, a laminate obtained by forming a transparent conductive layer composed of FTO having a thickness of 1 μm on a transparent substrate which is composed of glass and has a thickness of 1 mm was prepared. Next, as illustrated in FIG. 3, the groove 90 was formed on the transparent conductive layer 12 by a $CO_2$ laser (V-460 manufactured by Universal Laser Systems Inc.), and the transparent conductive layers 12A to 12F were formed. At this time, the width of the groove 90 was set to 1 mm. In addition, each of the transparent conductive layers 12A to 12C was formed so as to have the main body portion having a quadrangular shape of 4.6 cm×2.0 cm and the protruding portion protruding from the side edge portion of one side of the main body portion. In addition, the transparent conductive layer 12D was formed so as to have the main body portion having a quadrangular shape of 4.6 cm×2.1 cm and the protruding portion protruding from the side edge portion of one side of the main body. In addition, the protruding portion 12c of the three transparent conductive layers 12A to 12C among the transparent conductive layers 12A to 12D was constituted by the projecting portion 12d projecting from the one side edge portion 12b of the main body portion 12a and the facing portion 12e which is extended from the projecting portion 12d and faced the main body portion 12a of the adjacent transparent conductive layer 12. In addition, the protruding portion 12c of the transparent conductive layer 12D was constituted only by the projecting portion 12d projecting from the one side edge portion 12b of the main body portion 12a. At this time, the length of the projecting direction the direction orthogonal to the X direction in FIG. 2) of the projecting portion 12d was set to 2.1 mm and the width of the projecting portion 12d was set to 9.8 mm. In addition, the width of the facing portion 12e was set to 2.1 mm and the length of the facing portion 12e in the extending direction was set to 9.8 mm.

In addition, the transparent conductive layer 12D was formed so as to have not only the main body portion 12a and the protruding portion 12c but also the first current extracting portion 12f and the first connecting portion 12g connecting the first current extracting portion 12f and the main body portion 12a. The transparent conductive layer 12E was formed so as to have the second current extracting portion 12h and the second connecting portion 12i. At this time, the width of the first connecting portion 12g was set to 1.3 mm and the length thereof was set to 59 mm. In addition, when the resistance value of the first connecting portion 12g was measured by the four probe method, it was 100Ω.

Next, a precursor of the connecting terminal 16 constituted by the conductive material connecting portion 16A and the conductive material non-connecting portion 16B was formed on the protruding portion 12c of the transparent conductive layers 12A to 12C. Specifically, the precursor of the connecting terminal 16 was formed such that a precursor of the conductive material connecting portion 16A was provided on the facing portion 12e and a precursor of the conductive material non-connecting portion 16B was provided on the projecting portion 12d. At this time, the precursor of the conductive material non-connecting portion 16B was formed so as to be narrower than the width of the conductive material connecting portion 16A. The precursor of the connecting terminal 16 was formed by applying the silver paste ("GL-6000X16" manufactured by FUKUDA METAL FOIL & POWDER Co., LTD.) by screen printing and drying it.

Furthermore, a precursor of the first current collecting wiring 17 was formed on the first connecting portion 12g of the transparent conductive layer 12D. The precursor of the first current collecting wiring 17 was formed by applying the silver paste by screen printing and drying it.

In addition, precursors of the external connecting terminals 18a and 18b for extracting the current to the outside were formed on the first current extracting portion 12f and the second current extracting portion 12h of the transparent conductive layer 12D, respectively. The precursors of the external connecting terminals were formed by applying the silver paste by screen printing and drying it.

Moreover, a precursor of the insulating material 33 composed of a glass frit was formed so as to enters into the first groove 90A and to cover the edge portion of the main body portion 12a forming the first groove 90A. The insulating material 33 was formed by applying a paste containing a glass frit by screen printing and drying it. At this time, the edge portion of the transparent conductive layer covered with the insulating material 33 was the part between the groove 90 and the position 0.2 mm away from the groove 90.

In addition, in order to fix the back sheet 80, in the same manner as the insulating material 33, a precursor of the annular coupling portion 14 composed of a glass frit was formed so as to surround the insulating material 33 and to pass through the transparent conductive layer 12D, the transparent conductive layer 12E, and the transparent conductive layer 12F. In addition, at this time, the precursor of the coupling portion 14 was formed such that the precursor of the first current collecting wiring 17 was disposed on the inner side thereof. In addition, the coupling portion 14 was formed such that the first current extracting portion and the second current extracting portion were disposed on the outer side thereof. The coupling portion 14 was formed by applying a paste containing a glass frit by screen printing and drying it.

Furthermore, a precursor of the oxide semiconductor layer 13 was formed on the main body portion 12a of each of the transparent conductive layers 12A to 12D. The precursor of the oxide semiconductor layer 13 was formed by applying the paste for porous oxide semiconductor layer formation containing titania ("PST-21NR" manufactured by JGC C & C) three times by screen printing and drying it, and then by further applying the paste for porous oxide semiconductor layer formation containing titania ("PST-400C" manufactured by JGC C & C) by screen printing and then drying it.

Next, the precursor of the connecting terminal 16, the precursor of the first current collecting wiring 17, the precursors of the external connecting terminals 18a and 18b, the precursor of the insulating material 33, the precursor of the coupling portion 14, the precursor of the insulating material 33, and the precursor of the oxide semiconductor layer 13 were fired at 500° C. for 15 minutes to form the connecting terminal 16, the first current collecting wiring 17, the external connecting terminals 18a and 18b, the coupling portion 14, the insulating material 33, and the oxide semiconductor layer 13. At this time, the width of the conductive material connecting portion of the connecting terminal 16 was 1.0 mm and the width of the conductive material non-connecting portion thereof was 0.3 mm. In addition, the length along the extending direction of the conductive material connecting portion was 7.0 mm and the length along the extending direction of the conductive material non-connecting portion was 7.0 mm. In addition, the dimensions of the first current collecting wiring 17, the external connecting terminals 18a and 18b, the coupling portion 14, and the oxide semiconductor layer 13 were as follows, respectively.

First current collecting wiring 17: 4 μm in thickness, 200 μm in width, 79 mm in length along the X direction in FIG. 2, and 21 mm in length along the direction orthogonal to the X direction in FIG. 2, External connecting terminals 18a and 18b: 20 μm in thickness, 2 μm in width, and 7 mm in length, Coupling portion 14: 50 μm in thickness, 3 mm in width, and Oxide semiconductor layer 13: 13 μm in thickness, 17 mm in length in the X direction in FIG. 2, and 42.1 mm in length in the direction orthogonal to the X direction in FIG. 2

Next, the working electrode was immersed for a whole day and night in a dye solution containing 0.2 mM of a photosensitizing dye consisting of N719 and a mixed solvent prepared by mixing acetonitrile and tert-butanol at a volume ratio of 1:1 as the solvent, and then taken out therefrom and dried, and thus the photosensitizing dye was supported on the oxide semiconductor layer.

Next, the electrolyte composed of 2 M of hexylmethylimidazolium iodide, 0.3 M of n-methylbenzimidazole, 0.1 M of guanidinium thiocyanate in a solvent composed of 3-methoxypropionitrile was coated on the oxide semiconductor layer and dried, and the electrolyte was disposed.

Next, the first integrated sealing portion forming body for forming the first sealing portion was prepared. The first integrated sealing portion forming body was obtained by preparing one sheet of resin film for sealing which had 8.0 cm×4.6 cm×50 μm and was composed of an ethylene-methacrylic acid copolymer (trade name: NUCREL, manufactured by DU PONT-MITSUI POLYCHEMICALS CO., LTD.) and forming four quadrangular-shaped openings in the resin film for sealing. At this time, the first integrated sealing portion forming body was fabricated such that each opening had a size of 1.7 cm×4.4 cm×50 μm, the width of the annular portion was 2 mm, and the width of the partitioning portion partitioning the inner side opening of the annular portion was 2.6 mm.

Thereafter, the first integrated sealing portion forming body was superimposed on the insulating material 33 of the working electrode and then the first integrated sealing portion forming body was adhered to the insulating material 33 of the working electrode by heating to melt.

Next, four sheets of the counter electrodes were prepared. Two counter electrodes of the four sheets of the counter electrodes were prepared by forming the catalyst layer which had a thickness of 5 nm and was composed of platinum on the titanium foil of 4.6 cm×1.9 cm×40 μm by the sputtering method. The rest two counter electrodes of the four sheets of the counter electrodes were prepared by forming the catalyst layer which had a thickness of 5 nm and was composed of platinum on the titanium foil of 4.61 cm×2.0 cm×40 μm by the sputtering method. In addition, another first integrated sealing portion forming body was prepared and this first integrated sealing portion forming body was adhered to the surface facing the working electrode of the counter electrode in the same manner as above.

Thereafter, the first integrated sealing portion forming body adhered to the working electrode was allowed to face the first integrated sealing portion forming body adhered to the counter electrode, and thus the first integrated sealing portion forming bodies were superimposed on each other. The first integrated sealing portion forming bodies were then melted by heating while applying a pressure to the first integrated sealing portion forming bodies in this state. The first sealing portion was formed between the working electrode and the counter electrode in this manner. At this time, the width P of the adhesive portion of the partitioning portion of the first integrated sealing portion with the surface on the transparent conductive substrate side of the counter electrode, the width Q of the adhesive portion of the annular portion of the first integrated sealing portion with the surface on the transparent conductive substrate side of the counter electrode, the width R of the partitioning portion of the first integrated sealing portion, and the width T of the annular portion thereof were as follows, respectively.

P=1.0 mm
Q=2.0 mm
R=2.6 mm
T=2.2 mm

Next, the second integrated sealing portion was prepared. The second integrated sealing portion was obtained by preparing one sheet of resin film for sealing which had 8.0 cm×4.6 cm×50 μm and was composed of maleic anhydride modified polyethylene (trade name: Bynel, manufactured by Du Pont) and forming four quadrangular-shaped openings in the resin film for sealing. At this time, the second integrated sealing portion was fabricated such that each opening had a size of 1.7 cm×4.4 cm×50 μm, the width of the annular portion was 2 mm, and the width of the partitioning portion partitioning the inner opening of the annular portion was 2.6 mm. The second integrated sealing portion was bonded to the counter electrode so as to sandwich the edge portion of the counter electrode together with the first integrated sealing portion. At this time, the second integrated sealing portion was bonded to the counter electrode and the first integrated sealing portion by heating the first integrated sealing portion and the second integrated sealing portion to melt while pressing the second integrated sealing portion to the counter electrode.

Next, the desiccant sheet was bonded on the metal substrate of each counter electrode with double-sided tape. The dimensions of the desiccant sheet were 1 mm in thickness×3 cm in length×1 cm in width, and Zeosheet (trade name, manufactured by Shinagawa Chemicals Co., Ltd.) was used as the desiccant sheet.

Next, as illustrated in FIG. 2, the bypass diodes 70A to 70C were respectively fixed to the three partitioning portions of the second integrated sealing portion by applying the low-temperature curing type silver paste (Dotite D500 manufactured by FUJIKURAKASEI CO., LTD.) so as to continue from the terminals at both ends of the bypass diode to the metal substrate 21 of the counter electrode 20. In addition, the bypass diode 70D was fixed on the annular portion of the second integrated sealing portion of the DSC 50D among the four DSCs 50A to 50D by applying the above low-temperature curing type silver paste so as to continue from one terminal of the terminals at both ends of the diode to the counter electrode. In this manner, the conductive material 60Q was formed so as to link the two adjacent bypass diodes with respect to the four bypass diodes 70A to 70D. At this time, the conductive material 60Q was formed by curing the above low-temperature curing type silver paste at 30° C. for 12 hours. RB751V-40 manufactured by ROHM was used as the bypass diode.

In addition, the conductive material 60P was formed by applying the low-temperature curing type silver paste (Dotite D-500 manufactured by FUJIKURAKASEI CO., LTD.) and curing it so as to connect each of the conductive materials 60Q between the bypass diodes and the conductive material connecting portion on the three transparent conductive layers 12A to 12C, respectively. Moreover, for the bypass diode 70A, the conductive material 60P was formed by applying the above low-temperature curing type silver paste and curing it so as to be connected with the conductive material connecting portion on the second connecting portion 12i of the transparent conductive layer 12E. At this time, the conductive material 60P was formed by curing the above low-temperature curing type silver paste at 30° C. for 12 hours.

Next, the butyl rubber ("Aikameruto" manufactured by Aica Kogyo Co., Ltd.) was coated on the coupling portion 14 with a dispenser while being heated at 200° C. to form a precursor of the adhesive portion. On the other hand, a laminate, which is obtained by laminating a polybutylene terephthalate (PBT) resin film (50 μm in thickness), aluminum foil (25 μm in thickness), and a film (50 μm in thickness) composed of Bynel (trade name, manufactured by Du Pont) in this order, was prepared. Thereafter, the peripheral portion of this laminate 80A was superimposed on the precursor of the adhesive portion 80B, and a pressure was applied thereto for 10 seconds. In this manner, the back sheet 80 constituted by the adhesive portion 80B and the laminate 80A was obtained on the coupling portion 14. The DSC module was obtained in the manner described above.

Example 2

The DSC module was fabricated in the same manner as in Example 1 except that the first current collecting wiring 17 was not formed.

Example 3

The DSC module was fabricated in the same manner as in Example 1 except that the coupling portion 14 was not formed.

Example 4

The DSC module was fabricated in the same manner as in Example 1 except that the first current collecting wiring 17 was formed before forming the coupling portion 14 so as to be connected with the external connecting terminal 18a through the first connecting portion 12g and the first current extracting portion 12f from the main body portion 12a of the transparent conductive layer 12D and the coupling portion 14 was formed such that the first current collecting wiring 17 intersected with the coupling portion 14.

Example 5

The DSC module was fabricated in the same manner as in Example 1 except that the width P of the adhesive portion of the partitioning portion of the first integrated sealing portion with the surface on the transparent conductive substrate side of the counter electrode, the width Q of the adhesive portion of the annular portion of the first integrated sealing portion with the surface on the transparent conductive substrate side of the counter electrode, the width R of the partitioning portion of the first integrated sealing portion, and the width T of the annular portion of the first integrated sealing portion were respectively as follows when the first integrated sealing portion was formed between the working electrode and the counter electrode.

P=1.4 mm
Q=2.0 mm
R=0.4 mm
T=3.2 mm

Example 6

The DSC module was fabricated in the same manner as in Example 1 except that the width P of the adhesive portion of the partitioning portion of the first integrated sealing portion with the surface on the transparent conductive substrate side of the counter electrode, the width Q of the adhesive portion of the annular portion of the first integrated sealing portion with the surface on the transparent conductive substrate side of the counter electrode, and the width R of the partitioning portion of the first integrated sealing portion and the width T of the annular portion of the first integrated sealing portion were respectively as follows when the first integrated sealing portion was formed between the working electrode and the counter electrode.

P=0.8 mm
Q=1.5 mm
R=0.8 mm
T=2.4 mm

Example 7

The DSC module was fabricated in the same manner as in Example 1 except that the second integrated sealing portion was not bonded to the counter electrode and the first integrated sealing portion.

Example 8

The DSC module was fabricated in the same manner as in Example 1 except that the width P of the adhesive portion of the partitioning portion of the first integrated sealing portion with the surface on the transparent conductive substrate side of the counter electrode, the width Q of the adhesive portion of the annular portion of the first integrated sealing portion with the surface on the transparent conductive substrate side of the counter electrode, and the width R of the partitioning portion of the first integrated sealing portion were respectively as follows when the first integrated sealing portion was formed between the working electrode and the counter electrode.

P=0.5 mm
Q=0.5 mm
R=0.6 mm
T=1.6 mm

Example 9

The DSC module was fabricated in the same manner as in Example 1 except that the width of the conductive material non-connecting portion was ⅓ time of the width of the conductive material connecting portion.

Example 10

The DSC module was fabricated in the same manner as in Example 1 except that the width of the conductive material non-connecting portion 16 was the same as the width of the conductive material connecting portion 16.

(Characteristic Evaluation)
(Photoelectric Conversion Characteristic)

The photoelectric conversion efficiency η (%) was measured for the DSC modules obtained in Examples 1 to 4 under an illuminance of 200 lux. In addition, the photoelectric conversion efficiency η (%) was measured for the DSC modules obtained in Examples 1 to 4 under an illuminance of 20000 lux as well in the same manner as above. The results are presented in Table 1.

(Aperture Ratio)

The aperture ratio was measured for the DSC modules obtained in Example 1 and Examples 5 to 8. The results are presented in Table 2.

(Durability)

The photoelectric conversion efficiency ($\eta_0$) was measured for the DSC modules obtained in Example 1 and Examples 5 to 8. Subsequently, for the DSC modules obtained in Example 1 and Examples 5 to 8, the photoelectric conversion efficiency (TI) after leaving the DSC modules for 1000 hours under the atmospheric pressure in a high-temperature and high-humidity environment of 85° C. and 85% RH was also measured. Thereafter, the retention rate of the photoelectric conversion efficiency (photoelectric conversion retention rate) was calculated based on the following Equation. The results are presented in Table 2.

Retention rate of photoelectric conversion efficiency (%)=η/$\eta_0$×100

(Connection Reliability)

The connection reliability was evaluated for the DSC modules obtained in Example 1 and Examples 9 and 10 by performing the heat cycle test in conformity to JIS C 8938 and examining the presence or absence of peeling of the connecting terminal from the transparent conductive layer. The results are presented in Table 3. Meanwhile, the heat cycle test 1 was performed 200 cycles when the cycle to raise or lower the environmental temperature from −40° C. to 90° C. was set to 1 cycle.

TABLE 1

| | Photoelectric conversion efficiency η (%) | |
| --- | --- | --- |
| | 200 lux | 20000 lux |
| Example 1 | 16 | 10 |
| Example 2 | 15 | 7 |
| Example 3 | 16 | 10 |
| Example 4 | 15 | 10 |

TABLE 2

| | Aperture ratio (%) | Durability Photoelectric conversion retention rate (%) |
| --- | --- | --- |
| Example 1 | 56 | 75 |
| Example 5 | 55 | 85 |
| Example 6 | 59 | 70 |
| Example 7 | 56 | 58 |
| Example 8 | 65 | 32 |

TABLE 3

| | Connection reliability Heat cycle test 1 (200 cycles) |
| --- | --- |
| Example 1 | Absence |
| Example 9 | Absence |
| Example 10 | Presence |

As presented in Table 1, it has been found that the DSC modules of Examples 1 to 4 exhibit a high photoelectric conversion efficiency under a low illuminance of 200 lux, but the photoelectric conversion efficiency decreases under a high illuminance of 20000 lux. In addition, all of the DSC modules of Examples 1 to 4 can achieve space saving since the first current extracting portion and the second current extracting portion are disposed so as to be adjacent to each other.

As presented in Table 2, it has been found that the DSC modules of Example 1 and Examples 5 to 7 can further increase the aperture ratio and exhibit a higher photoelectric conversion retention rate compared to the DSC module of Example 8.

As presented in Table 3, it has been found that in the DSC modules obtained in Example 1 and Example 9, the connecting terminal does not peel off from the transparent conductive layer in the heat cycle test 1. In contrast to this, it has been found that in the DSC module obtained in Example 10, the connecting terminal peels off from the transparent conductive layer through the heat cycle test 1.

Based on the above, it has been confirmed that it is possible to achieve space saving while exhibiting excellent photoelectric conversion characteristics according to the DSC element for low illuminance of the invention.

EXPLANATIONS OF REFERENCE NUMERALS

11 . . . transparent substrate
12 . . . transparent conductive layer
12F . . . transparent conductive layer (separating portion)
12$a$ . . . main body portion
12$c$ . . . protruding portion
12$e$ . . . facing portion
12$f$ . . . first current extracting portion
12$h$ . . . second current extracting portion
12$g$ . . . first connecting portion
12$i$ . . . second connecting portion
13 . . . oxide semiconductor layer
14 . . . coupling portion
15 . . . transparent conductive substrate (first electrode)
16 . . . connecting terminal
16A . . . conductive material connecting portion
16B . . . conductive material non-connecting portion
17 and 417 . . . current collecting wiring
20 . . . counter electrode (second electrode)
21 . . . metal substrate
30A . . . sealing portion
31$a$ and 32$a$ . . . annular portion
31$b$ and 32$b$ . . . partitioning portion
31 . . . first integrated sealing portion
32 . . . second integrated sealing portion
33 . . . insulating material
50 and 50A to 50D . . . dye-sensitized solar cell
60P and 60Q . . . conductive material
80 . . . back sheet
80$a$ . . . peripheral portion of back sheet
90A . . . first groove (gap)
90B . . . second groove (gap)
100, 200, 300 and 400 . . . dye-sensitized solar cell module (dye-sensitized solar cell element)
500 . . . dye-sensitized solar cell element

The invention claimed is:

1. A dye-sensitized solar cell element for low illuminance comprising:
   at least one dye-sensitized solar cell;
   a first current extracting portion for extracting current from the at least one dye-sensitized solar cell; and
   a second current extracting portion for extracting current from the at least one dye-sensitized solar cell,
   wherein the dye-sensitized solar cell includes
   a first electrode having a transparent substrate and a transparent conductive layer provided on one surface of the transparent substrate,
   a second electrode facing the first electrode and having a metal substrate,
   an oxide semiconductor layer provided on the first electrode or the second electrode, and
   an annular sealing portion bonding the first electrode and the second electrode,
   the first current extracting portion is included in the transparent conductive layer of one dye-sensitized solar cell of the at least one dye-sensitized solar cell,
   the second current extracting portion is provided on the one surface of the transparent substrate of the at least one dye-sensitized solar cell and is electrically connected with the metal substrate of the second electrode of one dye-sensitized solar cell of the at least one dye-sensitized solar cell, the first current extracting portion and the second current extracting portion are disposed radially outside of the annular sealing portion so as to be adjacent to each other, and the oxide semiconductor layer is provided radially inside of the annular sealing portion;
   wherein the second current extracting portion is provided directly on the one surface of the transparent substrate of the at least one dye-sensitized solar cell.

2. The dye-sensitized solar cell element for low illuminance according to claim 1, further comprising a back sheet covering the at least one dye-sensitized solar cell on the one surface side of the transparent substrate.

3. The dye-sensitized solar cell element for low illuminance according to claim 2, wherein an insulating coupling portion is provided on the entire circumference of a peripheral portion of the back sheet,
a separating portion connecting the transparent substrate and the coupling portion being provided so as to surround the transparent conductive layer of the at least one dye-sensitized solar cell and to form a gap with the transparent conductive layer is further included,
the separating portion is provided so as to form a cyclic structure together with the first current extracting portion and the second current extracting portion, and
a part of the gap is disposed on an inner side of the coupling portion.

4. The dye-sensitized solar cell element for low illuminance according to claim 2,
wherein the first current extracting portion and the second current extracting portion are disposed in the vicinity of one dye-sensitized solar cell of the at least one dye-sensitized solar cell, and
the metal substrate of the second electrode of one dye-sensitized solar cell of the at least one dye-sensitized solar cell is connected with the second current extracting portion by a second connecting portion.

5. The dye-sensitized solar cell element for low illuminance according to claim 4, further comprising a second current collecting wiring provided on the second connecting portion and having a lower resistance than the second connecting portion.

6. The dye-sensitized solar cell element for low illuminance according to claim 5, wherein the second collecting wiring is disposed so as not to intersect with the peripheral portion of the back sheet.

7. The dye-sensitized solar cell element for low illuminance according to claim 4, wherein the second connecting portion is disposed on an inner side than the peripheral portion of the back sheet.

8. The dye-sensitized solar cell element for low illuminance according to claim 2,
wherein the first current extracting portion and the second current extracting portion are disposed in the vicinity of one dye-sensitized solar cell of the at least one dye-sensitized solar cell, and
the transparent conductive layer of one dye-sensitized solar cell of the at least one dye-sensitized solar cell further has
a main body portion provided on an inner side of the annular sealing portion and
a first connecting portion connecting the main body portion and the first current extracting portion.

9. The dye-sensitized solar cell element for low illuminance according to claim 8, further comprising a first current collecting wiring provided at least on the first connecting portion of one dye-sensitized solar cell of the at least one dye-sensitized solar cell along the first connecting portion and having a lower resistance than the first connecting portion.

10. The dye-sensitized solar cell element for low illuminance according to claim 9, wherein the first current collecting wiring is disposed so as not to intersect with the peripheral portion of the back sheet.

11. The dye-sensitized solar cell element for low illuminance according to claim 1, comprising a plurality of the dye-sensitized solar cells,
wherein the transparent substrate is constituted by a common transparent substrate of the plurality of dye-sensitized solar cell,
the second electrodes of two adjacent dye-sensitized solar cells are spaced apart from each other,
the sealing portion has an annular first sealing portion provided between the first electrode and the second electrode,
the first sealing portions of two adjacent dye-sensitized solar cells are integrated to constitute a first integrated sealing portion,
the first integrated sealing portion has an annular portion and a partitioning portion partitioning an opening in the annular portion, and
a width of an adhesive portion of the partitioning portion of the first integrated sealing portion with a surface on the first electrode side of the second electrode is narrower than a width of an adhesive portion of the annular portion of the first integrated sealing portion with a surface on the first electrode side of the second electrode.

12. The dye-sensitized solar cell element for low illuminance according to claim 11, wherein a width of the partitioning portion is 100% or more and less than 200% of a width of the annular portion in the first integrated sealing portion.

13. The dye-sensitized solar cell element for low illuminance according to claim 11,
wherein the sealing portion of the plurality of dye-sensitized solar cells further has an annular second sealing portion which is provided so as to be superimposed on the first sealing portion and which sandwiches an edge portion of the second electrode together with the first sealing portion, and
the second sealing portion is integrated to constitute a second integrated sealing portion.

14. The dye-sensitized solar cell element for low illuminance according to claim 1, comprising a plurality of the dye-sensitized solar cells, the plurality of dye-sensitized solar cells being connected in series and electrically,
wherein the dye-sensitized solar cell connected with an adjacent dye-sensitized solar cell among the plurality of dye-sensitized solar cells further includes a connecting terminal provided on the transparent conductive layer,
the transparent conductive layer has
a main body portion provided on an inner side of the annular sealing portion and
a protruding portion which protrudes from the main body portion to an outer side of the sealing portion and on which the connecting terminal is provided,
the connecting terminal of one dye-sensitized solar cell of two adjacent dye-sensitized solar cells is connected with the metal substrate of the second electrode of the other dye-sensitized solar cell via a conductive material,
the connecting terminal has
a conductive material connecting portion connected with the conductive material and extending on an outer side of the sealing portion along a fixed direction and
a conductive material non-connecting portion extending from the conductive material connecting portion on an outer side of the sealing portion along a fixed direction, and
a width of the conductive material non-connecting portion is narrower than a width of the conductive material connecting portion.

15. The dye-sensitized solar cell element for low illuminance according to claim 1, wherein the second current extracting portion is included in the transparent conductive layer.

16. The dye-sensitized solar cell element for low illuminance according to claim 1, further comprising another transparent conductive layer provided on the transparent substrate, wherein the second current extracting portion is included in the other transparent conductive layer.

17. A dye-sensitized solar cell element for low illuminance comprising:
- at least one dye-sensitized solar cell;
- a first current extracting portion for extracting current from the at least one dye-sensitized solar cell; and
- a second current extracting portion for extracting current from the at least one dye-sensitized solar cell,
- wherein the dye-sensitized solar cell includes
- a first electrode having a transparent substrate and a transparent conductive layer provided on one surface of the transparent substrate,
- a second electrode facing the first electrode and having a metal substrate,
- an oxide semiconductor layer provided on the first electrode or the second electrode, and
- an annular sealing portion bonding the first electrode and the second electrode,
- the first current extracting portion is included in the transparent conductive layer of one dye-sensitized solar cell of the at least one dye-sensitized solar cell,
- the second current extracting portion is provided on the one surface of the transparent substrate of the at least one dye-sensitized solar cell and is electrically connected with the metal substrate of the second electrode of one dye-sensitized solar cell of the at least one dye-sensitized solar cell, the first current extracting portion and the second current extracting portion are disposed radially outside of the annular sealing portion so as to be adjacent to each other, and the oxide semiconductor layer is provided radially inside of the annular sealing portion;
- wherein the second current extracting portion is included in the transparent conductive layer.

18. A dye-sensitized solar cell element for low illuminance comprising:
- at least one dye-sensitized solar cell;
- a first current extracting portion for extracting current from the at least one dye-sensitized solar cell; and
- a second current extracting portion for extracting current from the at least one dye-sensitized solar cell,
- wherein the dye-sensitized solar cell includes
- a first electrode having a transparent substrate and a transparent conductive layer provided on one surface of the transparent substrate,
- a second electrode facing the first electrode and having a metal substrate,
- an oxide semiconductor layer provided on the first electrode or the second electrode, and
- an annular sealing portion bonding the first electrode and the second electrode,
- the first current extracting portion is included in the transparent conductive layer of one dye-sensitized solar cell of the at least one dye-sensitized solar cell,
- the second current extracting portion is provided on the one surface of the transparent substrate of the at least one dye-sensitized solar cell and is electrically connected with the metal substrate of the second electrode of one dye-sensitized solar cell of the at least one dye-sensitized solar cell, the first current extracting portion and the second current extracting portion are disposed radially outside of the annular sealing portion so as to be adjacent to each other, and the oxide semiconductor layer is provided radially inside of the annular sealing portion;
- further comprising another transparent conductive layer provided on the transparent substrate, wherein the second current extracting portion is included in the other transparent conductive layer.

* * * * *